United States Patent
Steenstrup et al.

(10) Patent No.: US 12,055,627 B2
(45) Date of Patent: *Aug. 6, 2024

(54) MULTIFAN SURVEY SYSTEM AND METHOD

(71) Applicant: R3VOX LTD, Birkirkara (MT)

(72) Inventors: Jens Steenstrup, B'Kara (MT); Christopher Tiemann, Austin, TX (US); Mark Chun, Austin, TX (US); Kirk Hobart, Austin, TX (US)

(73) Assignee: R3VOX LTD (MT)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,476

(22) Filed: Jul. 25, 2022

(65) Prior Publication Data

US 2022/0373677 A1 Nov. 24, 2022

Related U.S. Application Data

(63) Continuation of application No. 16/133,547, filed on Sep. 17, 2018, now Pat. No. 11,428,809, which is a continuation of application No. 15/802,307, filed on Nov. 2, 2017, now Pat. No. 10,094,924, which is a continuation of application No. 15/495,362, filed on Apr. 24, 2017, now Pat. No. 9,817,117, which is a continuation-in-part of application No. 15/476,137, filed on Mar. 31, 2017, now Pat. No. 10,132,924.

(60) Provisional application No. 62/372,231, filed on Aug. 8, 2016, provisional application No. 62/329,631, filed on Apr. 29, 2016.

(51) Int. Cl.
*G01S 15/89* (2006.01)

(52) U.S. Cl.
CPC ................................ *G01S 15/89* (2013.01)

(58) Field of Classification Search
None
See application file for complete search history.

(56) References Cited

U.S. PATENT DOCUMENTS

| | | | |
|---|---|---|---|
| 3,144,631 A | 8/1964 | Lustig et al. | |
| 4,403,314 A | 9/1983 | Tournois | |
| 4,611,313 A | 9/1986 | Ziese | |
| 5,377,163 A | 12/1994 | Simpson | |
| 5,483,499 A | 1/1996 | Brumley et al. | |
| 5,808,580 A | 9/1998 | Andrews | |
| 5,812,494 A | 9/1998 | Medeiros | |
| 6,285,628 B1 | 9/2001 | Kiesel | |
| 7,092,440 B1 | 8/2006 | Dress, Jr. et al. | |
| 8,305,841 B2 | 11/2012 | Riordan et al. | |
| 9,244,168 B2 | 1/2016 | Proctor | |

(Continued)

OTHER PUBLICATIONS

Orchistron, W., Stephenson, R,, Debarbat, S., and Nha, I.-S. (eds.), "The Rise and Fall of the Chris Cross: A Pioneering Australian Radio Telescope", 2004. Astronomical Instruments and Archives From the Asia-Pacfic Region. Yonsei University Press, Seoul. pp. 157-162.

(Continued)

*Primary Examiner* — Hovhannes Baghdasaryan
(74) *Attorney, Agent, or Firm* — Paul D. Chancellor; Ocean Law

(57) ABSTRACT

A survey system including a multibeam echo sounder having a single projector array and a single hydrophone array constructs a multi-component message for ensonifying multiple fans and deconstructs a corresponding message echo for use in analyzing the returns from each fan.

42 Claims, 18 Drawing Sheets

(56) References Cited

U.S. PATENT DOCUMENTS

| | | |
|---|---|---|
| 2002/0126577 A1 | 9/2002 | Borchardt |
| 2007/0025183 A1 | 2/2007 | Zimmerman et al. |
| 2010/0331689 A1 | 12/2010 | Wegner |
| 2011/0202278 A1 | 8/2011 | Caute et al. |
| 2012/0081996 A1 | 4/2012 | Frivik et al. |
| 2012/0327741 A1 | 12/2012 | Pearce |
| 2015/0006085 A1 | 1/2015 | Bisley et al. |
| 2016/0018516 A1 | 1/2016 | Brown et al. |
| 2016/0025882 A1 | 1/2016 | Schneider et al. |
| 2017/0256855 A1 | 9/2017 | Robinson et al. |

OTHER PUBLICATIONS

Slattery, B. R., "Use of Mills cross receiving arrays in radar systems", Proc. IEE, vol. 113, No. 11, Nov. 1966, pp. 1712-1722.
Larry A. Mayer; Frontiers in Seafloor Mapping and Visualization, Marine Geophysical Researches, Kluwer Academic Publishers, DO, vol. 27, No. 1 Mar. 2006, pp. 7-17, XP019403134, ISSN; 1573-0581, DOI; 10.1007/S11001-005-0267-X.
Jaffe J S et al.: "Multibeam Imaging Using Spatially Variant Insonification", The Journal of the Acoustical Society of America, American Institute of Physics for the Accoustical Society of America, New York, NY, US, vol. 83, No. 4, Apr. 1, 1988, pp. 1458-1464, XP001221875, ISSN; 0001-4966, DOI;10.1121/1.395953.
Stytsenko Eugene et al.: "A mid-range 3D sonar", 2013 MTS/IEEE Oceans-Bergen, IEEE, Jun. 10, 2013, pp. 1-5, XP032487863, DOI; 10.1109/OCEANS-BERGEN, 2013.6607998.

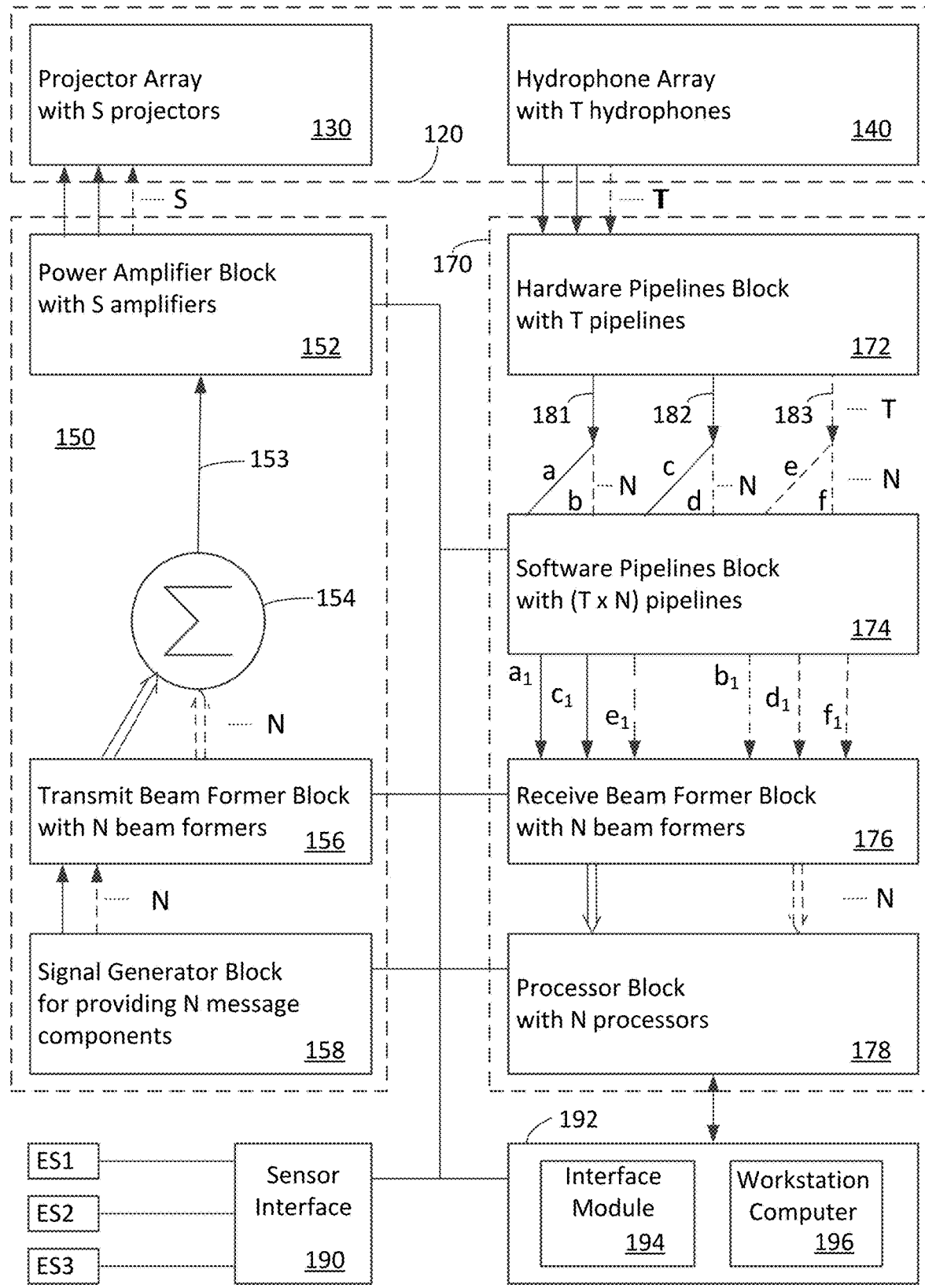

| SYMBOL | DESCRIPTION |
|---|---|
| AD | Analog to digital converter |
| BF | Beamformer |
| ESx | Sensor x |
| MF | Match filter |
| PA | Power amplifier |
| PRO | Processor |
| SG | Signal generator |
| ▽ | Amplifier |
| ⌐⌐ | Antialiasing filter |
| ⌒ | Band pass filter |
| ↓ | Decimator |
| ⓧ | Mixer |

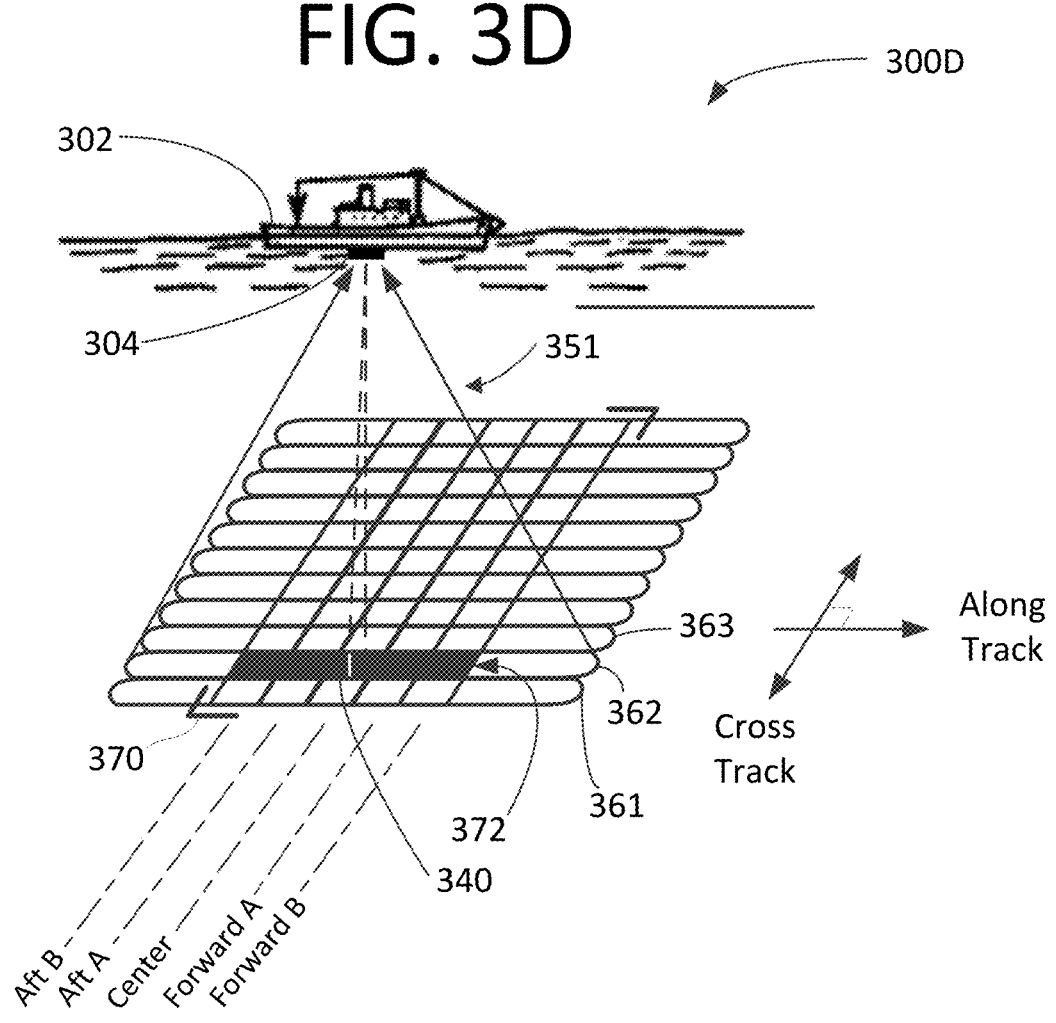

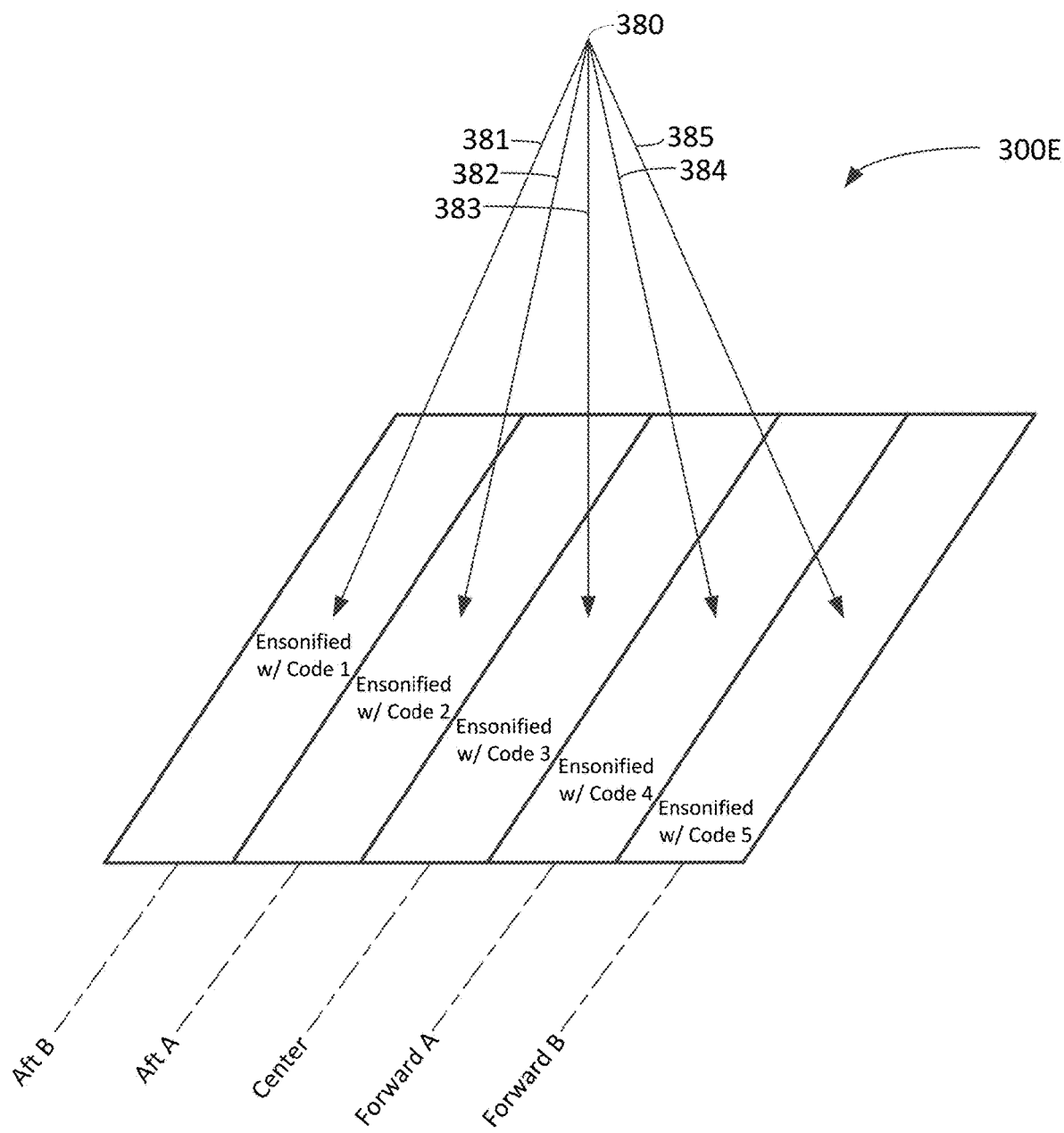

FIG. 4

| CODES & SEQUENCES | Spread Spectrum ||  Noise-Like |
|---|---|---|---|
| | Frequency Hopping | Direct Sequence | |
| Costas | X | | |
| Reed Solomon | X | | |
| Barker | | X | |
| Gold | | X | |
| Maximum-Length | | X | |
| Kasami | | X | |
| Walsh | | X | |
| Gaussian noise | | | X |
| Deterministic chaos | | | X |

500A

| Fan Inventory | Fan Location | Signal Type /Signal | Code | Spectrogram Of Transmitted Message Component |
|---|---|---|---|---|
| Fan 1 | Aft B | OSS/OSS1 | {1,2,4,3} |  |
| Fan 2 | Aft A | OSS/OSS2 | {1,3,4,2} |  |
| Fan 3 | Center | OSS/OSS3 | {1,4,2,3} |  |
| Fan 4 | Forward A | OSS/OSS4 | {2,1,3,4} |  |
| Fan 5 | Forward B | OSS/OSS5 | {2,3,1,4} |  |

Parallel-Serial Signals

Parallel-Serial Signals

MULTIFAN SURVEY SYSTEM AND METHOD

PRIORITY APPLICATION AND INCORPORATION BY REFERENCE

This application is a continuation of U.S. patent application Ser. No. 16/133,547 filed Sep. 17, 2018 which is a continuation of U.S. patent application Ser. No. 15/802,307 filed Nov. 2, 2017 now U.S. Pat. No. 10,094,924 which is a continuation of U.S. patent application Ser. No. 15/495,362 filed Apr. 24, 2017 now U.S. Pat. No. 9,817,117, which is a continuation-in-part of U.S. patent application Ser. No. 15/476,137 filed Mar. 31, 2017 now U.S. Pat. No. 10,132,924 which claims the benefit of U.S. Prov. Pat. App. No. 62/329,631 filed Apr. 29, 2016 and this application claims the benefit of 62/372,231 filed Aug. 8, 2016 all of which are included herein by reference, in their entirety and for all purposes. This application incorporates by reference, in their entireties and for all purposes, the disclosures of U.S. Pat. No. 3,144,631 concerning Mills Cross sonar, U.S. Pat. No. 8,305,841 concerning sonar used for mapping seafloor topography, U.S. Pat. No. 7,092,440 concerning spread spectrum communications techniques, U.S. Pat. No. 5,483,499 concerning Doppler frequency estimation, and U.S. Pat. No. 9,244,168 concerning frequency burst sonar.

BACKGROUND OF THE INVENTION

Field of the Invention

The present invention relates to underwater acoustical systems, methods for using underwater acoustical systems, and methods for processing and using the data they produce. In particular, the invention relates to survey systems including sonar systems capable of multifan ensonification of waterbody bottoms.

Discussion of the Related Art

A month after the Titanic struck an iceberg in 1912, English meteorologist Lewis Richardson filed a patent at the British Patent Office for an underwater ranging device. Modern day successors to Richardson's invention are often referred to as SONAR (sound navigation and ranging) devices. Among these devices are ones using transducer arrays to project sound or pressure waves through a liquid medium and transducer arrays to receive corresponding echoes from features that scatter and/or reflect impinging waves.

Information about these features and their environment can be derived from the echoes. For example, bathymetric surveys provide information about the depth of scattering centers, water column surveys provide information about scattering centers in the water column, and seafloor characterization surveys provide information about scattering centers at the seafloor surface and below the seafloor surface. The diversity and quality of the information returned in echoes may be determined in part by the characteristics of the signal used to excite the projector transducers.

The cost of obtaining this information is strongly influenced by the timeframe during which manpower and equipment is required to acquire the information.

Although some progress towards improving data quality and diversity while reducing the time required to perform an underwater survey has been made, particularly through the use of multibeam echo sounders, long standing technological challenges and risks associated with building and testing costly new survey equipment present significant obstacles to further similar improvements.

SUMMARY OF THE INVENTION

The present invention provides a multifan survey system and method. Multifan survey operations may be useful in multiple survey tasks including bathymetry, water column monitoring, forward look survey, Doppler velocimetry, Doppler current profiling, and motion stabilization.

Bathymetric surveys may benefit from multifan operation and related wider zones of ensonification with exemplary advantages including one or more of faster survey speeds, redundancy, and multi-aspect imaging of targets.

Water column monitoring may benefit from multifan operation in a manner similar to bathymetric surveys and also due to enlarged per ping volumes of ensonification. Applications include counting biologics, finding plumes, quantifying pollutant concentration, and the like.

Forward Look Sonar (FLS) may benefit from multifan operation, for example where the sonar is rotated 90 degrees to face its fans forward. In particular, multiple FLS fans enable searching a large volume in front of the source with each ping. Volume imaging applications include obstacle avoidance, monitoring underwater construction, and security, to name a few.

Doppler velocimetry may benefit from multifan operation with advantages including use of one or more of forward/backward steered fans that allow for a Janus-like configuration of beams from a multi-beam echo sounder where Doppler estimates like Doppler velocity log (DVL) estimates can be made. When the source is stationary, a similar arrangement may serve as an acoustic Doppler current profiler (ADCP).

Motion stabilization such as three axis motion stabilization may benefit from multifan operation. For example, it is common practice to use pitch/roll measurements at the time of a ping to electronically steer angular corrections, based on a vertical reference, such that all pings report data from the same beam angles regardless of vessel motion. The use of multiple fans may also support corrections for yaw, a rotation along a 3rd axis.

In an embodiment, a survey system provides for a multifan bathymetric survey, the survey system includes a multibeam echo sounder system for installation on a water going vehicle, the survey system comprising: an acoustic transceiver for use with one or more transducers in a single projector array and plural transducers in a single hydrophone array; the projector and hydrophone arrays in a Mills Cross arrangement; a transceiver transmitter for generating a message including $N>=3$ coded message components for ensonifying respective fans on a waterbody bottom; a transceiver receiver having a receiver operating frequency range, the receiver for receiving returns from the ensonified fans that overlap in time and frequency; N matched filters in the receiver, each matched filter uniquely and selectively detecting returns from a respective fan; and, the operating frequency range of the receiver including a message component frequency band; wherein the message components overlap in time and frequency.

In some survey system embodiments, each of the message components occupies a majority of, or substantially all of the message component frequency band. A majority of may refer to more than 50% of the message component frequency band or more than 75% of the message component frequency band. Substantially all may refer to more than 90% of the message component frequency band. Substantially all may also refer to transceiver technology limitations that result in frequency errors that are small when compared to the transmitter operating frequency band.

And, in some survey system embodiments, the survey system further comprises: N signal generators in the transceiver transmitter, each signal generator for generating a respective one of the coded message components.

In some survey system embodiments, the survey system further comprises: N spread spectrum signal generators in the transceiver transmitter, each signal generator for generating a respective one of the coded message components; and, wherein the message component frequency band occupies less than one-half of the receiver operating frequency range. In yet other survey system embodiments, the survey system further comprises: N spread spectrum signal generators in the transceiver transmitter, each signal generator for generating a respective one of the coded message components; and, wherein the message component frequency band occupies substantially all of the receiver operating frequency range.

In some survey system embodiments, the survey system further comprises: a set of differing frequency hopping codes, each code used to guide the selection of three or more frequencies characterizing each message component. In some survey system embodiments, the survey system further comprises: wherein the message component includes sequential pulsed sinusoidal waveforms at the three or more frequencies. And, in some survey system embodiments, Costas codes are used to guide the selection of frequencies.

In some survey system embodiments, the message includes five or more message components. In some survey system embodiments, the message includes ten or more message components. In some survey system embodiments, the message includes twenty or more message components. In some of these embodiments, the message components within a message are transmitted in parallel. And, in some of these embodiments, the message components within a message are transmitted serially.

In some survey system embodiments, a message includes (y+z) message components; the y message components are transmitted in parallel in a time interval t1; the z message components are transmitted in parallel in a time interval t2; and, the time interval t2 begins later than the time interval t1.

BRIEF DESCRIPTION OF THE DRAWINGS

The present invention is described with reference to the accompanying figures. These figures, incorporated herein and forming part of the specification, illustrate embodiments of the invention and, together with the description, further serve to explain its principles enabling a person skilled in the relevant art to make and use the invention.

FIGS. 1B-F show embodiments of at least portions of the multibeam echo sounder system of FIG. 1A.

FIG. 1G shows a legend of selected symbols.

FIGS. 3B-F illustrate fan and multifan operations for use with the multibeam echo sounder system of FIG. 1A.

FIG. 4 shows a table of signal codes and sequences for use with the multibeam echo sounder system of FIG. 1A.

DETAILED DESCRIPTION OF THE PREFERRED EMBODIMENTS

The disclosure provided in the following pages describes examples of some embodiments of the invention. The designs, figures, and description are non-limiting examples of the embodiments they disclose. For example, other embodiments of the disclosed device and/or method may or may not include the features described herein. Moreover, described features, advantages or benefits may apply to only certain embodiments of the invention and should not be used to limit the disclosed invention.

As used herein, the term "coupled" includes direct and indirect connections. Moreover, where first and second devices are coupled, intervening devices including active devices may be located therebetween.

FIGS. 1A-E show a survey system including a multibeam echo sounder system and describe exemplary multibeam echo sounder embodiments. FIG. 1G shows a legend of selected symbols appearing on FIGS. 1C-F.

Figure 1A:
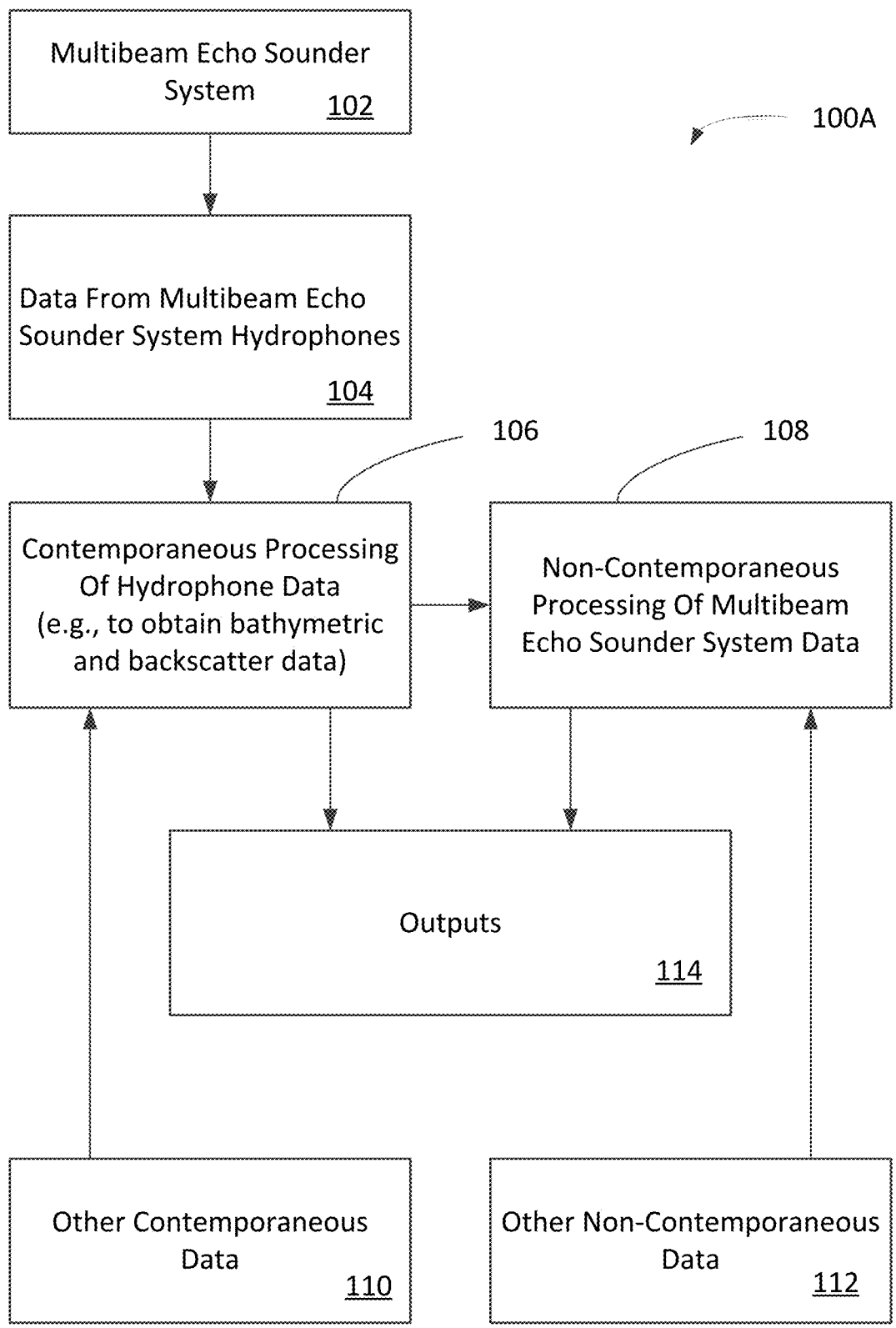
FIG. 1A shows a survey system including a multibeam echo sounder system of the present invention.

FIG. 1A shows a survey system in accordance with an embodiment of the present invention 100A. The survey system includes an echo sounder system such as a multibeam echo sounder system 102 which may be mounted on a surface vehicle or vessel, a remotely operated vehicle, an autonomous underwater vehicle, or the like. As is further described below, echo sounder and/or survey system outputs 114 may be contemporaneous with echo sounder processing of hydrophone data as in some embodiments for bathymetry or non-contemporaneous with processing of hydrophone data as in some embodiments for waterbody bottom classification.

Data acquired by multibeam echo sounder systems 104 includes data from echo sounder listening devices such as hydrophones (e.g., transducers) that receive echoes which are related to the acoustic/pressure waves emanating from the echo sounder projectors but have returned by virtue of an interaction with inhomogeneities of many kinds. The interactions may take the form of reflection or scattering. The inhomogeneities, also known as reflectors and scattering centers, represent discontinuities in the physical properties of the medium. Exemplary scattering centers may be found in one or more of i) an ensonified volume of the waterbody such as a water column, ii) upon the ensonified surface of the bottom, or within the ensonified volume of the sub-bottom.

Scattering centers of a biological nature may be present in the water column, as they are a part of the marine life. Scattering centers of a nonbiological nature may be present in the water column in the form of bubbles, dust and sand particles, thermal microstructure, and turbulence of natural or human origin, such as ships' wakes. Scattering centers on the surface of the bottom may be due to the mechanical roughness of the bottom, such as ripples, or be due to the inherent size, shape and physical arrangement of the bottom constituents, such as mud, sand, shell fragments, cobbles and boulders, or due to both the two factors. Scattering centers in the sub-bottom may be due to bioturbation of the sediments, layering of different sediment materials within the bottom or buried manmade structures such as pipelines.

Data processing within the echo sounder system may include contemporaneous processing of hydrophone data 106, for example to obtain bathymetric and/or backscatter data. Data processing may also include non-contemporaneous processing of multibeam echo sounder system data 108, for example to characterize bottom conditions or the water column.

Data processing may include utilization of complementary or other data. For example, contemporaneous processing of hydrophone data 106 may utilize contemporaneous 110 and/or non-contemporaneous 112 data such as contemporaneously collected geographic positioning system ("GPS") data, sound speed measurements, attitude, and navigational information. For example, non-contemporaneous processing of echo sounder system data may utilize contemporaneous 110 and/or non-contemporaneous 112 data such as non-contemporaneously collected waterbody bottom composition data and tidal records.

Figure 1B:
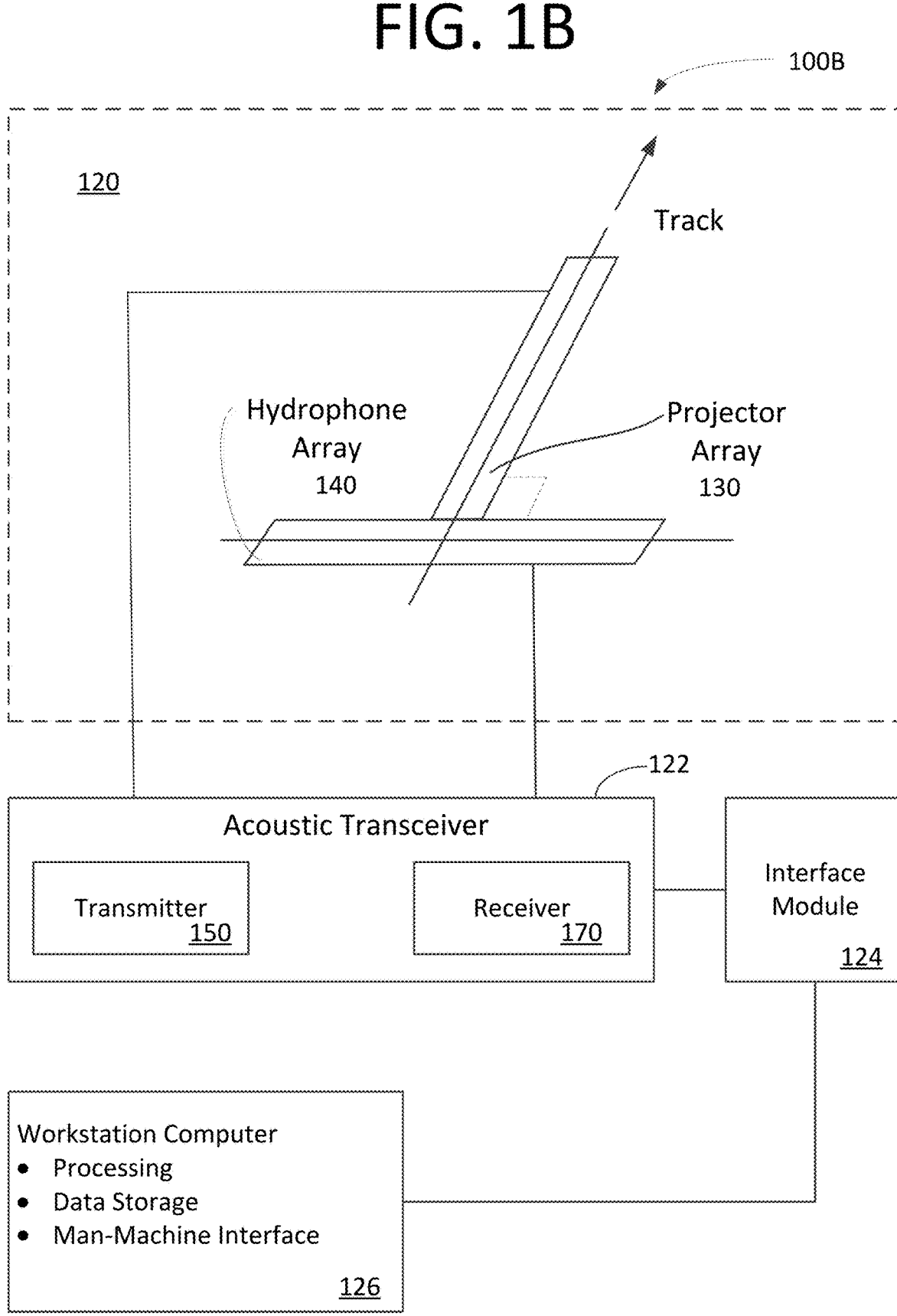

FIG. 1B shows portions of an exemplary multibeam echo sounder system ("MBES") 100B. The echo sounder system includes a transducer section 120 and an acoustic transceiver 122. The echo sounder system may include a transceiver interface such as an interface module 124 and/or a workstation computer 126 for one or more of data processing, data storage, and interfacing man and machine. Exemplary transducers, shown here in a Mills Cross arrangement 120, include a transmitter or projector array 130 and a receiver or hydrophone array 140. Projectors in the projector array may be spaced along a line that is parallel with a keel line or track of a vehicle or vessel to which they are mounted which may be referred to as an along track arrangement. In some embodiments, a receiver of the transceiver 122 has an operating frequency range matched with that of the projectors and/or the hydrophones.

During echo sounder operation, sound or pressure waves emanating from the projector array travel within a body of water and possibly within the bottom beneath the body of water and in doing so may undergo interactions, such as reflections or scattering, which disturb the propagation trajectory of the pressure waves. Some of the reflections or echoes are "heard" by the hydrophone array. See for example the disclosure of Etal, U.S. Pat. No. 3,144,631, which is included herein by reference, in its entirety and for all purposes.

The acoustic transceiver 122 includes a transmitter section 150 and a receiver section 170. The acoustic transceiver may be configured to transmit to a single projector array 130 and to receive from a single hydrophone array 140. In some embodiments, such a transceiver may be said to operate with a single transmitter array and a single receiver array. Unless otherwise noted, the term transceiver does not require common transmitter and receiver packaging.

In various embodiments, a single projector array ensonifies the entirety of a swath on a single ping. Here, a projector array may be a single projector array regardless of the geometry, arrangement, or quantity of devices employed. For example, where a plurality of projectors forms a plurality of spatially distinct projector groups, the plural projectors are a single projector array if they are operated to ensonify the entirety of a swath on a single ping.

The echo sounder may further include a means such as an interface module 124 for interconnection with the transceiver 122. This interface module may provide, among other things, a power supply for the transceiver, communications with the transceiver, communications with the workstation computer 126, and communications with other sources of data such as a source of contemporaneous GPS data.

The workstation computer 126 may provide for one or more of data processing such as data processing for visualization of survey results, for data storage such as storage of bathymetry data and backscatter data, for user inputs, and for display of any of inputs, system status, and survey results.

Figure 1C:
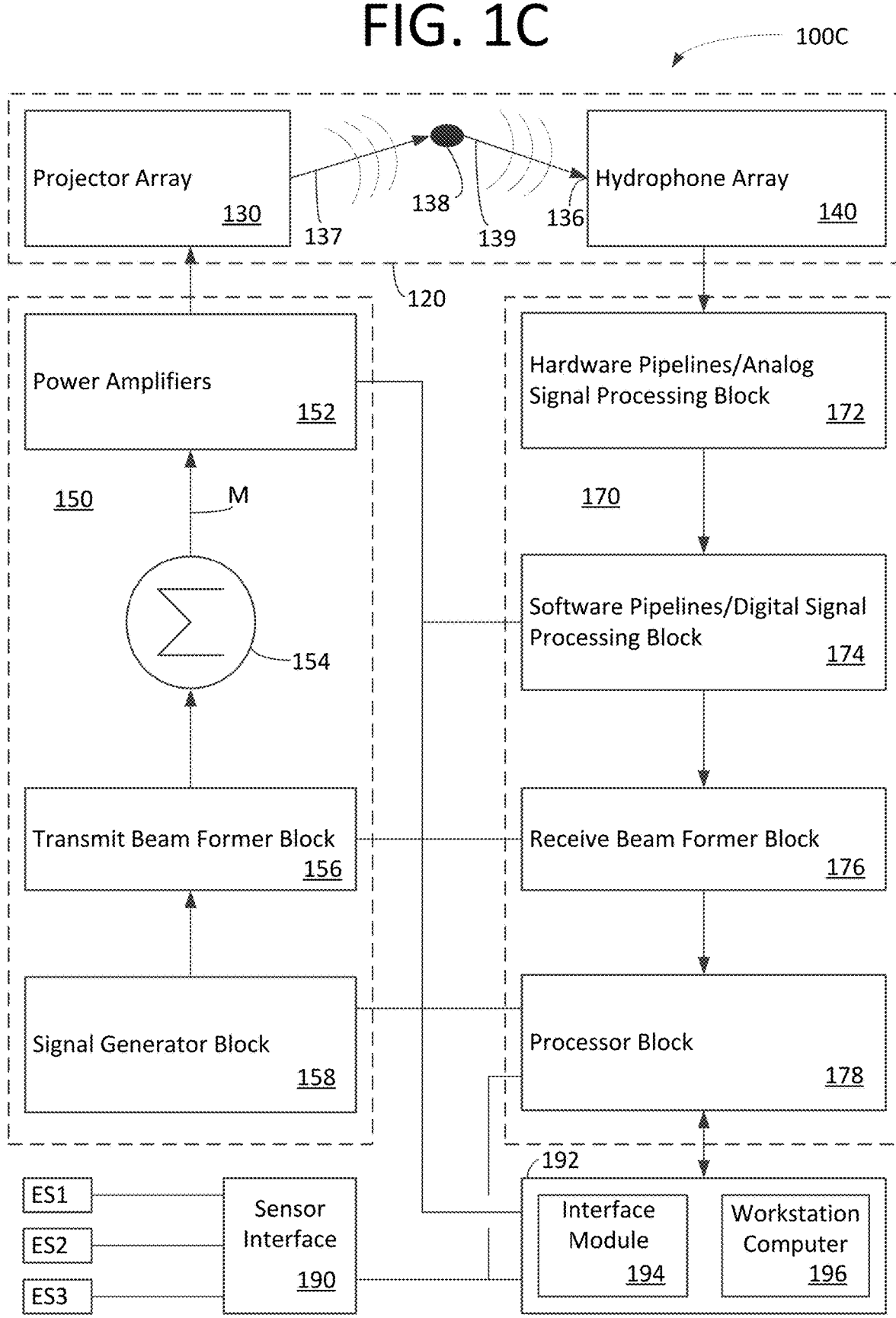

FIG. 1C shows portions of an exemplary multibeam echo sounder system ("MBES") 100C. The echo sounder system includes a transducer section 120, a transmitter section 150, and a receiver section 170. Some embodiments include a sensor interface section 190 and/or a management section 192.

The transducer section includes transducers for transmitting acoustic messages and transducers for receiving acoustic messages. For example, a transducer section may include an array of projectors 130 and an array of hydrophones 140.

Projectors in the projector array may include piezoelectric elements such as ceramic elements which may be stacked or not. Element geometries may include circular and non-circular geometries such as rectangular geometries. Some projectors have an operating frequency range of about 10 kHz to 100 kHz, of about 50 kHz to 550 kHz, or about 100 to 1000 kHz.

Hydrophones in the hydrophone array may include piezoelectric elements such as ceramic elements. Element geometries may include circular and non-circular geometries such as rectangular geometries. Some hydrophones have an operating frequency range of about 10 kHz to 100 kHz, of about 50 kHz to 550 kHz, or about 100 to 1000 kHz.

During operation of the projector array 130 and hydrophone array 140, the transmitter section excites the projector array, an outgoing message 137 emanates from the projector array, travels in a liquid medium to a reflector or scattering center 138, is reflected or scattered, after which a return or incoming message 139 travels to the hydrophone array 140 for processing by the receiver 170. Notably, the acoustic/pressure wave input 136 received at the hydrophone array 140 may include a perturbed version of the transmitted message 137 along with spurious signal and/or noise content.

The transmit section 150 may include a signal generator block 158, a transmit beamformer block 156, a summation block 154, and a power amplifier block 152. The transmit section provides for generation of or for otherwise obtaining one or more signals or message components 158 that will be used to compose a message 137. Notably, a message may be composed of multiple signals or not. Where a message is composed of multiple signals, the message may contain i) signals in parallel (superposed), ii) signals that are serialized (concatenated), or iii) may be a combination of parallel and serial signals.

The transmit beamformer block 156 receives the signal(s) from the signal generator block 158 where beamforming for each signal takes place. The beam(s) are combined in the summation block 154 to construct a parallel, serial, or combination message M. In the power amplifier block 152, the time series voltages of the message are amplified in order to excite or drive the transducers in the projector array 130. In an embodiment, each transducer is driven by a respective amplifier.

The receive section 170 includes multiple hydrophone signal processing pipelines. In an embodiment the receive section includes a hardware pipelines block/analog signal processing block 172, a software pipelines block/digital signal processing block 174, a receive beamformer block 176, and a processor block 178. The receive section provides for isolating and processing the message 137 from the input 136 received at the hydrophone array 140. For example, some embodiments process echoes to determine depths as a function of, among other things, round trip travel times that are based on matching a transmitted message 137 with a corresponding received message isolated from the hydrophone array input 136.

In the hardware pipeline block 172, plural hydrophone array transducers of the hydrophone array 140 provide inputs to plural hardware pipelines that perform signal conditioning and analog-to-digital conversion. In some embodiments, the analog-to-digital conversion is configured for oversampling where the converter Fin (highest input frequency) is less than $F_s/2$ (one half of the converter sampling frequency). In an embodiment, a transceiver 122 operates with a maximum frequency of about 800 kHz. In an embodiment the transceiver utilizes analog-to-digital converters with sampling rates in a range of about 5 to 32 MHz. In an embodiment the transceiver utilizes analog-to-digital converters with sampling rates of about 5 MHz or about 32 MHz.

In the software pipeline block 174, the hardware pipelines 172 provide inputs to the software pipelines. One or more pipelines serve each of the hydrophones in the hydrophone array. Each software pipeline provides downconversion and filtering. In various embodiments, the filter provides for recovery of a message from a hydrophone input 136. In an embodiment, each hydrophone is served by plural pipelines for interpreting, distinguishing, deconstructing and/or decoding a message such as a multicomponent message.

In the receive beamforming or steering block 176, the software pipelines 174 provide beamformer inputs. Beamformer functionality includes phase shifting and/or time delay and summation for multiple input signals. In an embodiment, a beamformer is provided for each of multiple coded signals. For example, where software pipelines operate using two coded signals, inputs to a first beamformer are software pipelines decoding a first code and inputs to a second beamformer are software pipelines decoding a second code.

In the processor block 178, the beamformers of the beamformer block 176 provide processor inputs. Processor functionality may include any one or more of bottom detection, backscatter processing, data reduction, Doppler processing, acoustic imaging, and generation of a short time series of backscatter sometimes referred to as "snippets."

In an embodiment, a management section 192 and a sensor interface section 190 are provided. The management section includes an interface module 194 and/or a workstation computer 196. The sensor interface section provides for interfacing signals from one or more sensors ES1, ES2, ES3 such as sensors for time (e.g. GPS), motion, attitude, and sound speed.

In various embodiments, control and/or control related signals are exchanged between the management section 192 and one or more of the power amplifier block 152, software pipelines block 174, transmit beamformer block 156, receive beamformer block 176, signal generator block 158, processor block 178. And, in various embodiments sensor interface section data 190 are exchanged with the management section 192 and the processor block 178.

FIG. 1D shows portions of an exemplary multibeam echo sounder system ("MBES") 100D. The echo sounder system includes a transducer section 120, a transmitter section 150, and a receiver section 170. Some embodiments include an interface section 190 and/or a management section 192.

In the embodiment shown, a message 153 incorporating quantity N signals, for example N different coded signals, is used to excite plural projectors in a projector array and a receiver having quantity T hardware or software pipelines and (T×N) hardware or software pipelines may be used to process T hydrophone signals for recovery of echo information specific to each of the N coded signals.

The transmitter section 150 is for exciting the projector array 130. The section includes a signal generator block 158, a transmit beamformer block 156, a summation block 154, and a power amplifier block 152.

The signal generator block 158 may generate quantity N signals or message components, for example N different coded signals (e.g., $S_{cd1} \ldots S_{cdN}$). In various embodiments, each of plural signals within a message may share a common center frequency and/or a common frequency band.

A transmit beamformer block 156 receives N signal generator block outputs. For each of the N signals generated, the beamformer block produces a group of output beam signals such that there N groups of output beam signals.

The summation block 154 receives and sums the signals in the N groups of output beams to provide a summed output 153.

The power amplifier block 152 includes quantity S amplifiers for driving respective projectors in the projector array 130. Each power amplifier receives the summed output or a signal that is a function of the summed output 153, amplifies the signal, and drives a respective projector with the amplified signal.

An array of quantity T hydrophones 140 is for receiving echoes of acoustic/pressure waves originating from the projector array 130. The resulting hydrophone signals are processed in the receiver section 170 which includes a hardware pipeline block 172, a software pipeline block 174, a receive beamformer block 176, and a processor block 178.

In the hardware pipeline block 172, T pipelines provide independent signal conditioning and analog-to-digital conversion for each of the T hydrophone signals.

In the software pipeline block 174, (T×N) software pipelines provide downconversion and filtering for each of the T hardware pipeline outputs. Means known in the art, for example matched filters, may be used to distinguish differently coded signals. As shown, each of T hardware pipeline outputs 181, 182, 183 provides N software pipeline inputs a,b and c,d and e,f (i.e., 3×2=6 where T=3 and N=2).

In the receive beamformer block 176, (T×N) software pipeline block 174 outputs are used to form N groups of beams. A beamformer is provided for each of N codes. For example, where there are T=3 hydrophones and software pipelines process N=2 codes, inputs to a first beamformer are software pipelines processing the first code $a_1$, $c_1$, $e_1$ and inputs to a second beamformer are software pipelines processing the second code $b_1$, $d_1$, $f_1$.

In the processor block 178, N processors receive respective groups of beams formed by the beamformer block 176. Processor block 178 data are exchanged with a management section 192 and sensor interface 190 data ES1, ES2, ES3 are provided to the management section and/or the processor block.

In various embodiments control signals from the management block 192 are used to make power amplifier block 152 settings (e.g., for "S" power amplifiers for shading), to control transmit 156 and receive 176 beamformers, to select software pipeline block 174 operating frequencies, and to set signal generator block 158 operating frequencies.

As the above illustrates, the disclosed echo sounder transmitter may construct a message incorporating N components such as N coded signals. And, the echo sounder may utilize a receiver having T hardware pipelines and (T×N) software pipelines to process T hydrophone signals for recovery of echo information specific to each of the N message components.

Figure 1E:
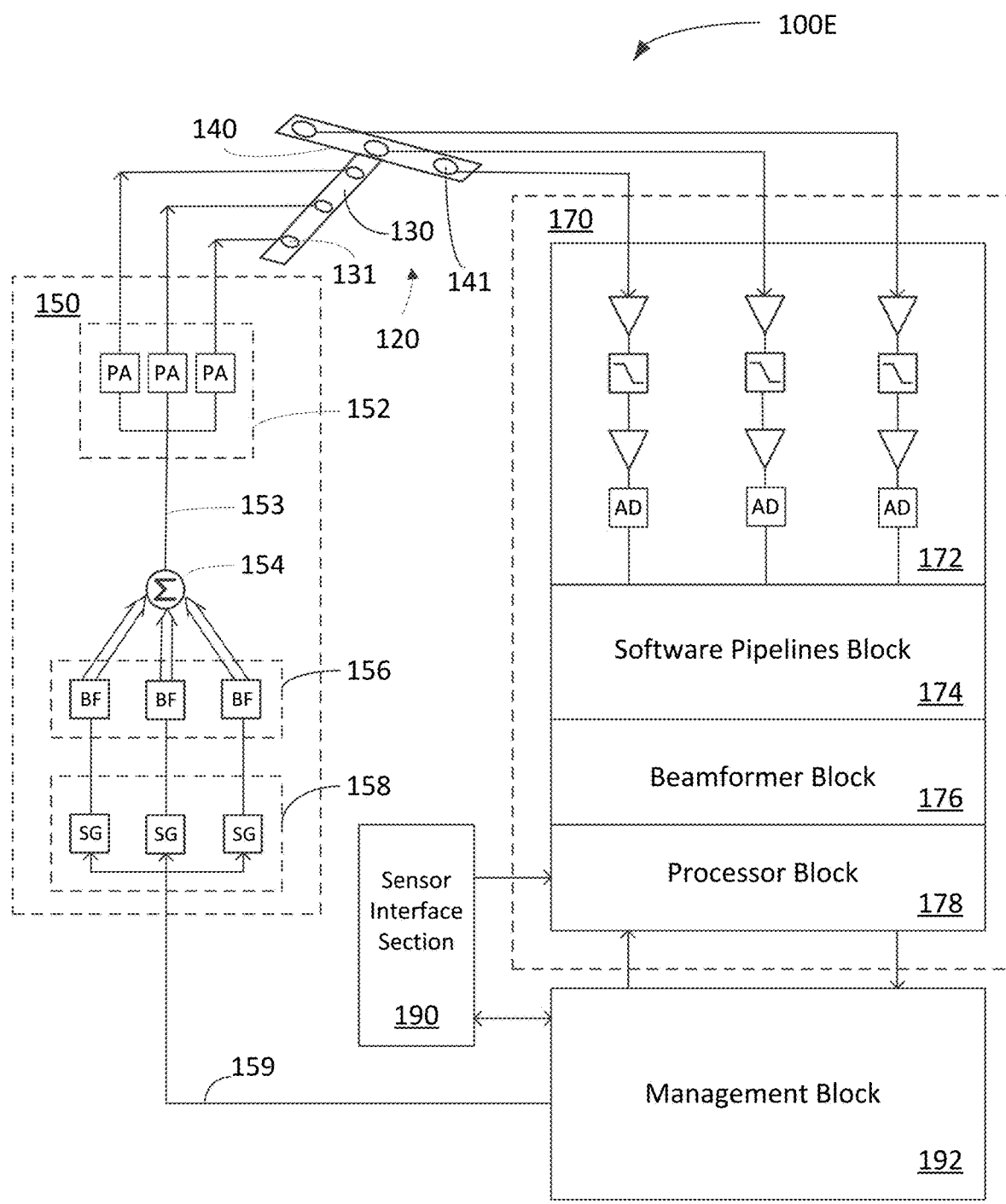
Figure 1F:
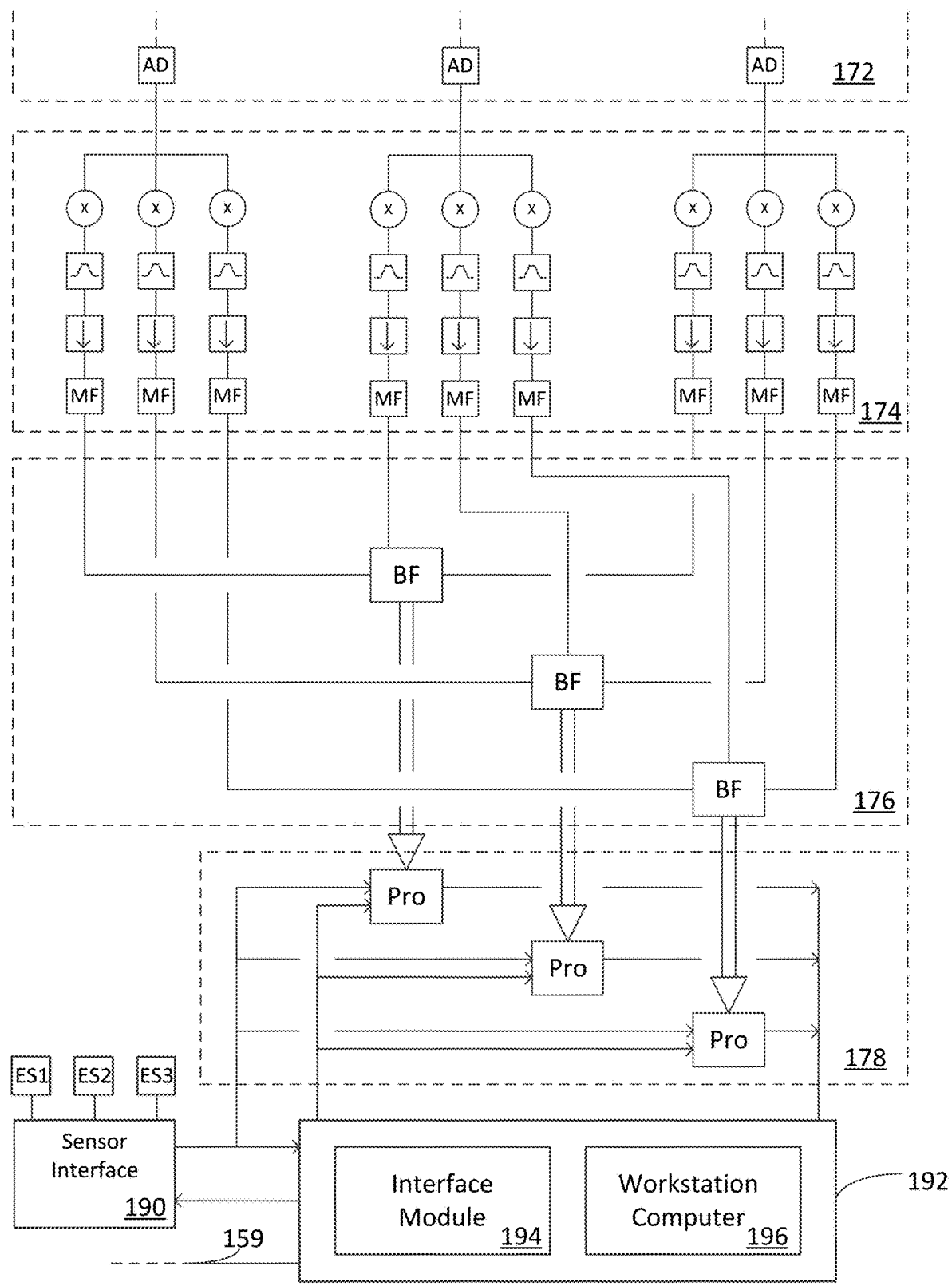

FIGS. 1E-F show portions of an exemplary multibeam echo sounder system ("MBES") 100E-F. The echo sounder system includes a transducer section 120, a transmitter section 150, and a receiver section 170. Some embodiments include an interface section 190 and/or a management section 192.

In the embodiment shown, a message 153 incorporating first, second, and third message components such as coded signals $S_{cd1}$, $S_{cd2}$, $S_{cd3}$ where N=3 is used to excite three projectors in a projector array, and a receiver having three hardware pipelines and nine software pipelines is used to process three hydrophone signals T=3 to recover echo information specific to each of the N message components.

The transmitter section 150 is for exciting the projector array 130. The section includes a signal generator block 158, a transmit beamformer block 156, a summation block 154, and a power amplifier block 152.

In the signal generator block 158, signals are constructed, generated, recalled and/or otherwise provided. Here, an exemplary process is depicted with e.g., N=3 signal generators. In respective beamformers of the beamformer block 156, multiple beams are generated from each signal. In a summation block 154, the beams are combined to produce a summation block output signal or transmit message 153.

The transducer block 120 includes a projector array 130 and a hydrophone array 140 arranged, for example, as a Mills Cross. As shown, there are three projectors 131 in the projector array and three hydrophones 141 in the hydrophone array. In the power amplifier block 152, the summed signal or transmit message 153 is an input to power amplifiers driving respective projectors.

Applicant notes that for convenience of illustration, the projector and hydrophone counts are limited to three. As skilled artisans will appreciate, transducer arrays do not require equal numbers of projectors and hydrophones nor do the quantities of either of these types of transducers need to be limited to three. For example, a modern multibeam echo sounder might utilize 1 to 96 or more projectors and 64 to 256 or more hydrophones.

The array of T=3 hydrophones 141 is for receiving echoes resulting from the acoustic/pressure waves originating from the projector array 130. The resulting hydrophone signals are processed in the receiver section 170 which includes a hardware pipeline block 172, a software pipeline block 174, a receive beamformer block 176, and a processor block 178.

In the hardware pipelines block 172, each of T=3 hardware pipelines processes a respective hydrophone 141 signal through analog components including an analog-to-digital converter. In the embodiment shown, a hardware pipeline provides sequential signal processing through a first amplifier, an anti-aliasing filter such as a low pass anti-aliasing filter, a second amplifier, and an analog-to-digital converter.

In the software pipelines block 174, each of the T=3 hardware pipeline outputs is processed through N=3 software pipelines with downconversion and matched filtering. In the embodiment shown, a software pipeline provides sequential signal processing through a mixer (an oscillator such as local oscillator may be coupled to the mixer), a bandpass filter, a decimator, and a matched filter. Communications may occur via communications links between any of the processor block 178, the signal generator block 158, the hardware pipelines block 172, the software pipelines block 174, the and the beamformer block 176. See for example FIGS. 1C-D.

Each software pipeline may have a single mixer and/or each hardware pipeline may have no mixer. A processor 178 may control gain of a first and/or a second hardware pipeline amplifier. A processor may provide for tuning, for example via a processor controlled oscillator coupled with a mixer.

In the receive beamformer block 176, each of N=3 beamformers processes signals. As such, i) a first set of three software pipeline outputs corresponding to a first coded signal are processed by a first beamformer, ii) a second set of three software pipeline outputs corresponding to a second coded signal are processed by a second beamformer, and (iii) a third set of three software pipeline outputs corresponding to a third coded signal are processed by a third beamformer. Notably, beamformers may be implemented in hardware or software. For example, one or more beamformers may be implemented in one or more field programmable gate arrays ("FPGA").

In the processor block 178, each of N=3 processors are for processing respective beamformer outputs. Here, a first plurality of beams generated by the first beamformer is processed in a first processor, a second plurality of beams generated by the second beamformer is processed in a second beamformer, and a third plurality of beams generated by the third beamformer is processed in a third beamformer.

Processor outputs interconnect with a management section 192. Notably, one or more processors may be implemented in a single device such as a single processor or digital signal processor ("DSP") or in multiple devices such as multiple signal processors or digital signal processors.

Complementary data may be provided via, inter alia, a sensor interface section 190 that is interfaced with a plurality of sensors ES1, ES2, ES3. The sensor interface module may provide sensor data to the management section 192 and/or to processors in the processor block 178.

The management section 192 includes a sonar interface 194 and/or a workstation computer 196. In various embodiments control signals from the management block 192 are used for one or more of making power amplifier block 152 settings (e.g., for array shading), controlling transmit 156 and receive 176 beamformers, selecting software pipeline block 174 operating frequencies, setting set signal generator block 158 operating frequencies, and providing processor block 178 operating instructions.

Applicant notes that the echo sounder systems of FIGS. 1C-F may be used to process hydrophone returns from targets i) present within an ensonified volume of the water body, ii) upon an ensonified surface of the bottom, or iii) lying within an ensonified volume of the bottom.

Figure 2A:
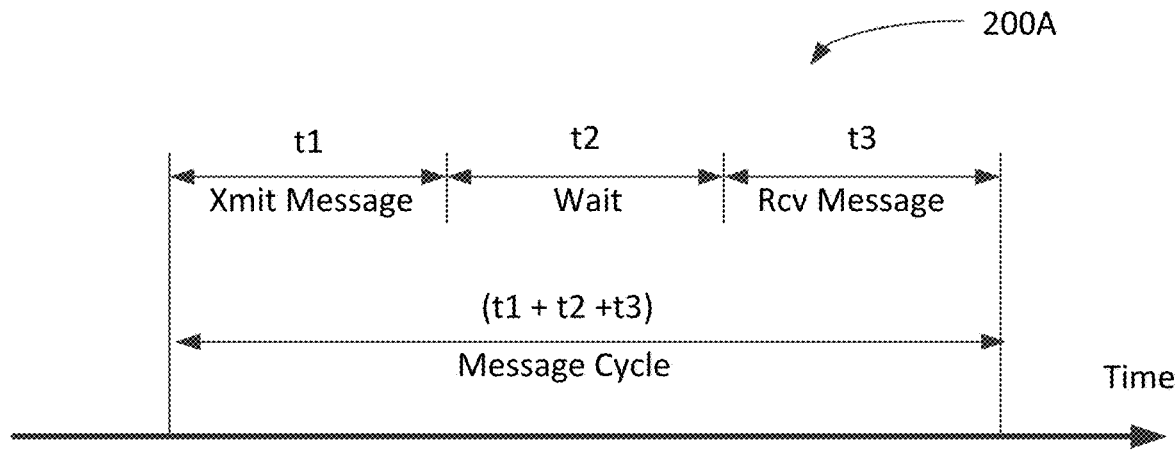
FIGS. 2A-B show message cycles for use with the multibeam echo sounder system of FIG. 1A.

FIG. 2A shows a first message cycle 200A. The cycle includes a sequence of operations with transmission of a message during a time t1 and reception of a message during a time t3. Transmission of a message refers to a process that excites the projector array 130 and reception of a message refers to a complementary process including message echo receipt by the hydrophone array 140. A wait time t2 that varies primarily with range, angle, and sound speed may be interposed between the end of the message transmission and the beginning of the message reception. This wait time may be determined by the sonar range scale setting or round trip travel time for the longest sounding range, for example a return from the most distant observed location or cell in a swath ensonified by the projector array. In some embodiments, the message transmit length is in a range of 10 to 60 microseconds. In some embodiments, the transmit message length is about 5-15 milliseconds or 10 milliseconds.

Figure 2B:
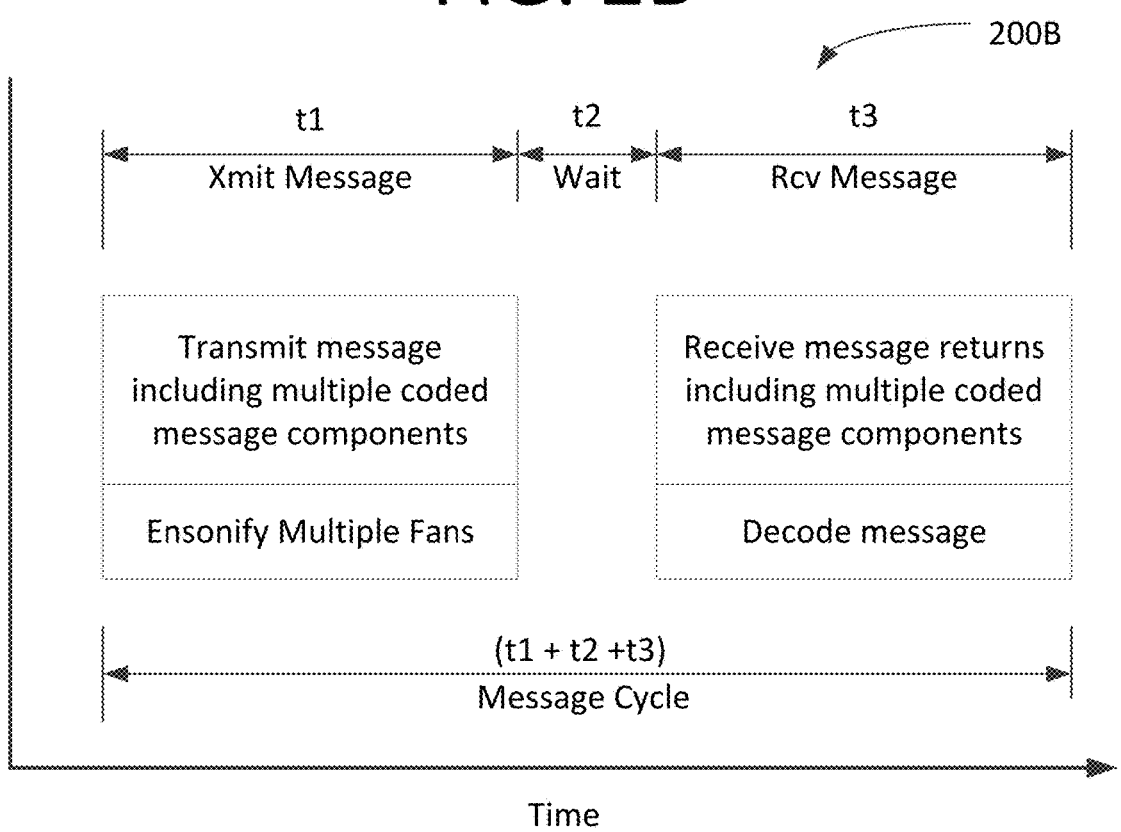

FIG. 2B shows a second message cycle 200B. Here, a transmitted message includes multiple coded message components. During transmission of the message, each of the message components is steered as by beamformers 156 to ensonify a respective strip or fan of a waterbody bottom as is further explained below. Each of the transmitted message components results in a similarly coded message component return. Decoding in the receiver separates these returns such that data specific to each fan is available for analyses.

Figure 3A:
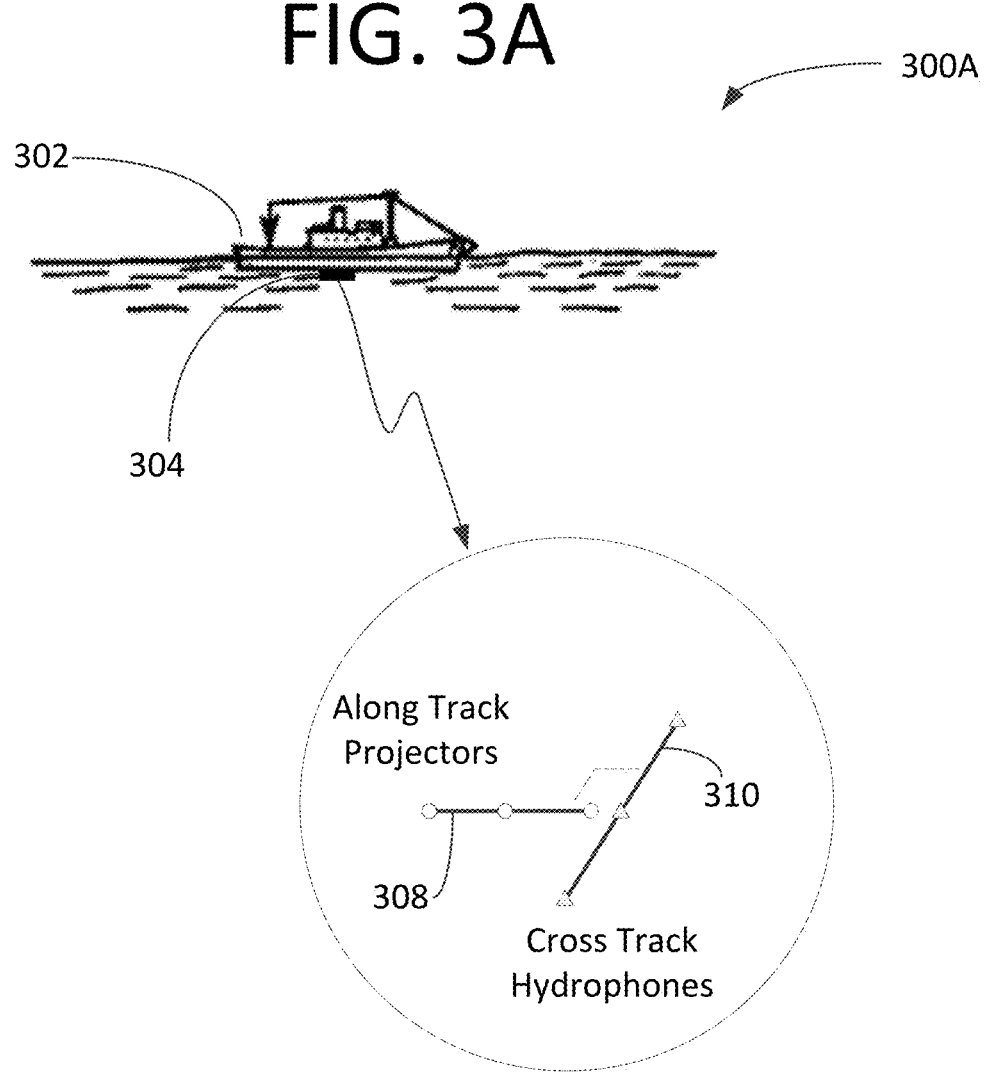
FIG. 3A shows a vessel equipped with a Mills cross type arrangement of arrays for use with the multibeam echo sounder system of FIG. 1A.

FIGS. 3A-D shows an exemplary vessel equipped with a multibeam echo sounder 300A-D. See for example the echo sounders of FIGS. 1A-E. As seen in FIG. 3A, an MBES array package 304 is affixed to a vessel 302, for example to a bottom of the vessel.

Within the array package 304 is an along track array of projectors 308 and a cross track array of hydrophones 310. The projector array is for excitation by a transmit message such as the message of FIG. 2A or FIG. 2B. The hydrophone array is for receiving echoes of the transmitted message. As explained below, a crossed array arrangement such as a Mills Cross arrangement of the projector and hydrophone arrays enables the echo sounder to operate with crossed transmit and receive beams wherein the cross intersection identifies a particular waterbody location, area, or cell. The crossed arrays may be in a perpendicular or a substantially perpendicular arrangement. Substantially perpendicular refers to generally small deviations from perpendicular caused by any of array assembly tolerances, mounting tolerances, adjustment tolerances, and the like.

Figure 3B:
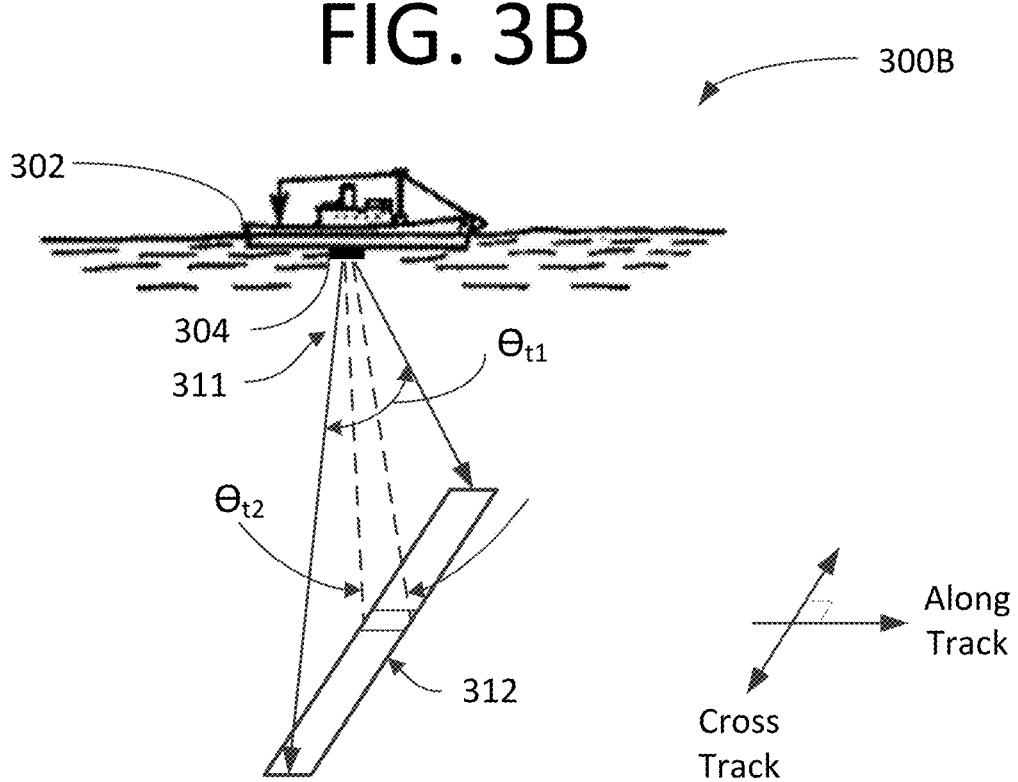

FIG. 3B shows bottom ensonification 300B. In particular, an across track strip or fan of a waterbody bottom 312 is ensonified by the projector array 308. Note the along track projector array 308 ensonifies an across track fan. As shown, the projected beam 311 has a wide across track aperture angle $\theta_{r1}$ as compared with a relatively narrow along track aperture angle $\theta_{r2}$. Echoes from this ensonified fan may be received by the hydrophone array 310.

Figure 3C:
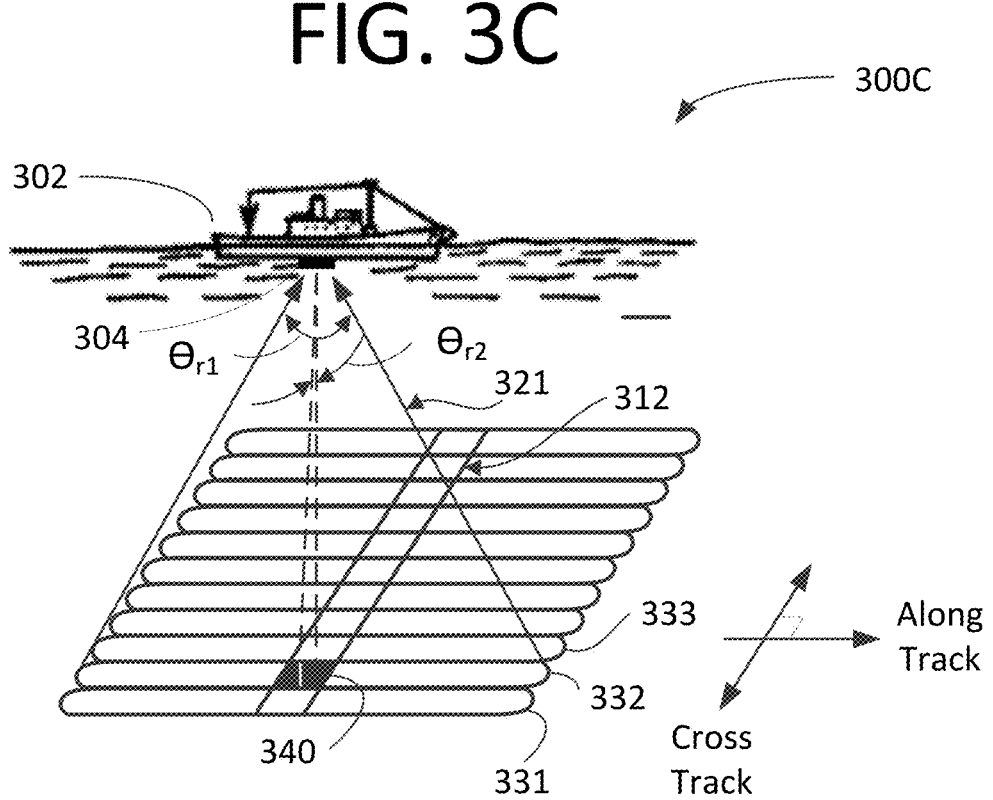

FIG. 3C shows bottom ensonification and echoes that result from the bottom 300C. In particular, echoes from the ensonified across track fan 312 are received by the hydrophone array 310. As shown, the received beam 321 has a wide along track aperture angle $\theta_{r1}$ as compared with a relatively narrow across track angle $\theta_{r2}$. And, as shown, the hydrophone array beam may be steered to observe or read a set of along track strips 331, 332, 333 . . . that intersect the ensonified fan 312 at multiple adjacent or overlapping locations. Data such as bathymetric data may be obtained from and associated with each of these intersecting locations or areas 340 such that each time an across track fan is ensonified, multiple receiving beams observe multiple receiving strips and provide bathymetric data at multiple locations along the ensonified fan.

Just as a single ensonified fan 312 may be observed or read by multiple receiving beams 321, so too may multiple ensonified fans be observed or read by multiple receiving beams.

FIG. 3D shows multifan bottom ensonification 300D. Here, the projector array is steered to produce multiple adjacent or overlapping ensonified strips or fans that are oriented across track. While any number of fans, such as 2, 3, 4, 5, 10 or more fans, may be projected, the example of FIG. 3D shows five projected fans comprising a center fan flanked by Forward A and Aft A fans which are flanked by Forward B and Aft B fans respectively. As before, multiple receiving beams 351 provide a set of along track receiving strips 361, 362, 363 . . . . These receiving strips intersect the multiple fans 372.

When a receiving strip 362 intersects multiple fans, a plurality 372 of cells 340 may be observed. And, when multiple receiving strips 361, 362, 363 . . . intersect multiple fans, a grid-like or two dimensional zone 370 results and bathymetric data may be obtained from each of the cells identified by intersections within the zone.

Applicant notes that as shown in FIG. 3D each of the fans has opposed cross-track boundaries that are essentially straight lines. This presentation is idealized. In practice, these opposed fan boundaries may be curved. For example, fan outlines on a waterbody bottom may be parabolic in shape with a cross-track major dimension. Transmit beam-forming and/or other than planar waterbody bottoms may contribute to fans having other than straight cross-track boundaries but that does not preclude locating the centers of the cells 340.

Advantages of multifan operation may include increased survey speed resulting from, for example, an extended along track zone of ensonification, redundancy via overlapping of zones (e.g., where a fifty percent overlap between pings may provide two looks at every waterbody bottom location observed), and imaging a given target from multiple aspects. For example, imaging from multiple aspects including at nadir and from two opposing off-nadir sides. For example, imaging from multiple aspects including front, overhead, and behind.

In various embodiments, realizing the benefits of a multifan survey system requires an MBES capable of distinguishing between echoes returned from each of the fans. While time separation of components within a message might be used, this requires that signals ensonifying each of the fans be separated in time. The content of a message may be transmitted in a single or in multiple message cycles. While frequency separation might be used, this requires that the receiver's bandwidth be divided. A more robust solution when echo signals include returns from multiple fans that overlap in time and that does not require division of receiver bandwidth is possible. In particular, transmitter messages that incorporate multiple parallel, serial, or parallel-serial coded message components can enable separation of message components. Further, where a message incorporates multiple serial components, the entire transmitter source level may be sequentially dedicated to each component such that higher energy signals result.

FIG. 3E shows a transmitted message ensonifying five fans 300E. Here, an MBES projector array 308 transmits 380 five formed beams 381-385 to a center fan, to Aft A and Forward A fans flanking the center fan, and to peripheral Aft B and Forward B fans. Each of the five formed beams 381-385 ensonifies a respective fan with one of five differing coded signals or message components within the message such that the receiver can associate message return components with their respective fans.

In the example shown, Aft B fan is ensonified with coded signal 1 by the first beam 381, the Aft A fan is ensonified with coded signal 2 by the second beam 382, the Center fan is ensonified with coded signal 3 by the third beam 383, the Forward A fan is ensonified with coded signal 4 by the fourth beam 384, and the Forward B fan is ensonified with coded signal 5 by the fifth beam 385. Notably, as described here, a single message may include all of the message components for ensonifying the multiple fans. Further, these message components may be arranged within a single message cycle i) serially such that the fans are ensonified in some sequential order, ii) in parallel such that the fans are simultaneously ensonified, or iii) in a serial-parallel message construct. In another example, these message components may be divided among multiple message cycles.

Figure 3F:
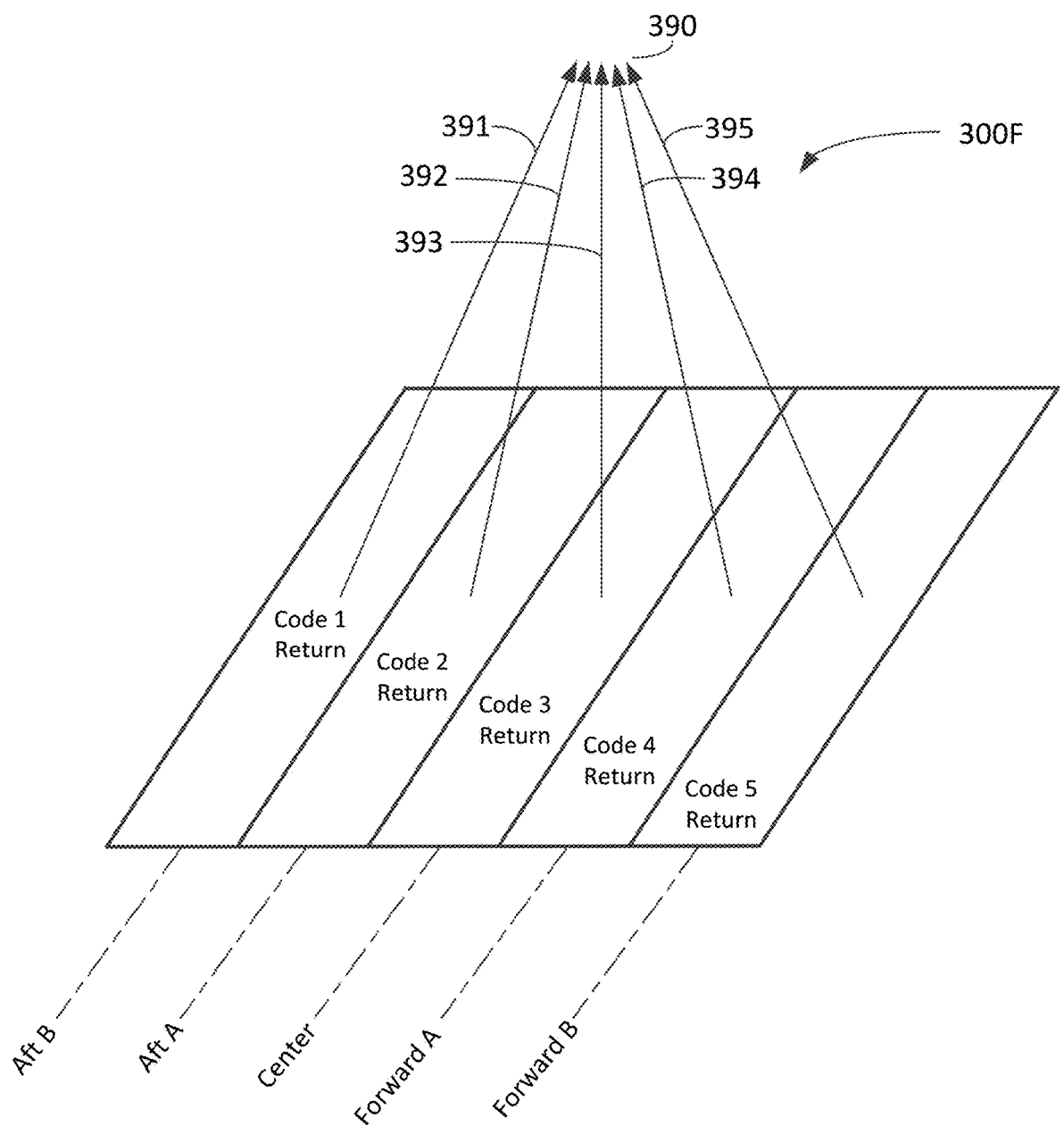

FIG. 3F shows returns 300F from the message of FIG. 3E. Here, an MBES hydrophone array 310 receives 390 five formed beams 391-395 from the center fan, from Aft A and Forward A fans flanking the center fan, and from peripheral Aft B and Forward B fans. Each of the five formed beams 391-395 provides returns from a respective fan with one of five differing message components included in the transmitted message such that the receiver can separate the returns.

FIG. 4 shows a table of signal codes and sequences ("codes") 400. Listed here are spread spectrum and noise-like codes that may be used to construct differing signals or message components for inclusion in a transmitted message. Differing waveforms and/or combinations of waveforms in the returns from such a message enable a receiver to discriminate among the message components, for example by matched filtering.

Signal spreading codes may be used to create spread spectrum signals. As seen in the table, signal spreading may be accomplished by frequency hopping. Frequency hopping uses a pseudorandom carrier shift of a frequency shift keyed (FSK) signal. Applicable coding includes Costas and Reed Solomon guided methods of frequency selection.

Signal spreading may also be accomplished by direct sequencing. With direct sequencing, there is a pseudorandom phase shift of a phase shift keyed (PSK) signal. Direct sequencing spread spectrum (DSSS) may utilize codes including Barker, Gold, Maximum-Length, Kasami, and Walsh guided methods of phase selection.

Another coding scheme provides for constructing signals that have a low predictability, for example noise-like coded signals. As shown in the table, noise-like waveform construction may be guided by pseudorandom inputs such as Gaussian noise and deterministic chaos. In various embodiments, either of signal frequency or phase may be manipulated by these pseudorandom inputs to construct differing waveforms for inclusion in a message such that returns are separable or uniquely separable by a receiver.

Not mentioned in the table are frequency and phase modulated signals which may also provide for distinguishing the waveforms, signals or message components in the returns from a transmitted message.

For example, in limited cases, one or more of linear FM, hyperbolic FM, stepped chirp, and Frank polyphase modulations may be used to create messages including a limited number (e.g., two) of distinguishable signals.

For example, in limited cases, one or more of frequency modulations (linear FM, hyperbolic FM, or others), stepped-chirp, and Frank polyphase modulations may be used to create messages including a limited number (e.g., two) of distinguishable signals.

FIGS. 5A-G show exemplary use 500A-G of one of the codes of FIG. 4. In particular, the figures illustrate use of Costas codes for guiding construction of differing combinations of waveforms wherein each waveform combination represents a given Costas code and message component in a transmitted message. As seen in FIG. 4 above, this use of Costas codes is a spread spectrum, frequency hopping technique.

Figure 5A:
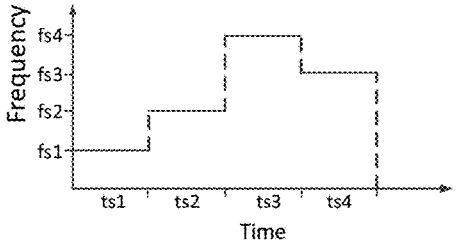
FIGS. 5A-G show various spread spectrum messages for use with the multibeam echo sounder system of FIG. 1A.
Figure 5A:
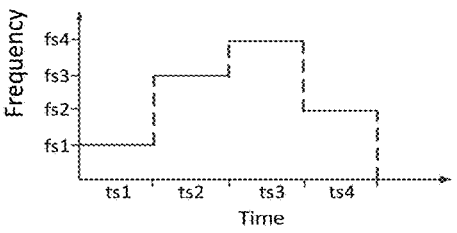
Figure 5A:
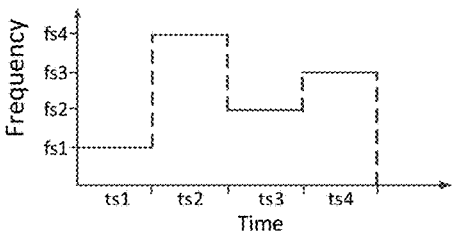
Figure 5A:
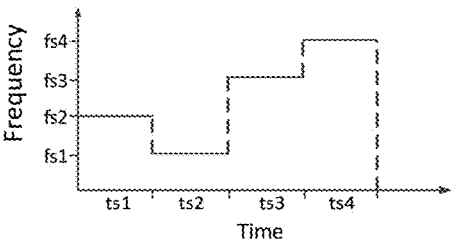
Figure 5A:
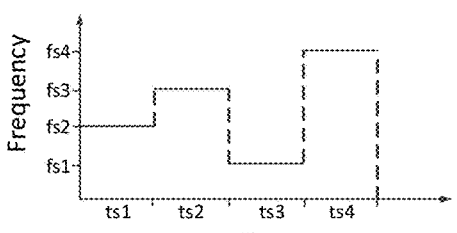

The table of FIG. 5A shows five transmitted fans that are ensonified by respective Costas coded signals 500A. In particular, five fans (e.g, 380 of FIG. 3E) are ensonified by five respective Costas coded signals.

Fan 1 in location Aft B is ensonified by an orthogonal spread spectrum signal ("OSS") designated OSS1. Based on a Costas array of order N=4, the signal's Costas code {1,2,4,3} is one of twelve valid Costas codes for this array order. Fan 2 in location Aft A is ensonified by an OSS signal designated OSS2 with Costas code {1,3,4,2}. Fan 3 in location Center is ensonified by an OSS signal designated OSS3 with Costas code {1,4,2,3}. Fan 4 in location Forward A is ensonified by an OSS signal designated OSS4 with Costas code {2,1,3,4}. Fan 5 in location Forward B is ensonified by an OSS signal designated OSS5 with Costas code {2,3,1,4}.

The rightmost column of the table shows spectrograms of message components for ensonifying respective fans. As seen, fan 1 is ensonified by a message component with coding guided by Costas code {1,2,4,3}. The spectrogram shows four time intervals ts1, ts2, ts3, ts4 and respective frequencies fs1, fs2, fs4, fs3. The waveforms associated with this spectrogram may be four sine waves having frequencies fs4>fs3>fs2>fs1 such that, for example, a plurality of cycles at a particular frequency establishes a spectrogram frequency.

In similar fashion, fan 2 is ensonified by a message component with coding guided by Costas code {1,3,4,2}, fan 3 is ensonified by a message component with coding guided by Costas code {1,4,2,3}, fan 4 is ensonified by a message component with coding guided by Costas code {2,1,3,4} and fan 5 is ensonified by a message component with coding guided by Costas code {2,3,1,4}.

Because transmitted message components are coded, the message returns may be separated or uniquely separated into individual returns from each of the fans. In some embodiments, this facility is provided when a receiver includes for each message component a filter such as a matched filter (see e.g. MF of FIG. 1F) that is designed to detect only that message component. In an embodiment, a receiver includes N matched filters and each filter selectively detects a respective fan return.

FIGS. 5B-G show exemplary parallel, serial, and parallel-serial messages 500B-G for ensonifying a plurality of fans (see e.g., FIG. 3E). As seen, these messages may occupy a portion, substantially all of, or all of a receiver's available bandwidth.

Regarding a choice of parallel and serial transmission of message components, altitude may determine the more desirable transmission format where altitude is a depth measured between a projector array and a waterbody bottom directly below the projector array. In particular, as altitude decreases, a message transmit time window is reduced when a transmission must end before a first echo is returned. Such a shortened transmit time window may create a preference for parallel rather than serial transmission of message components. As altitude decreases, there is also a tendency toward transmitter signal excess which further supports the use of parallel transmissions that share total source level.

In similar fashion, as altitude increases, a transmit time window is increased and transmission of serial message components may be desirable. Here there is a tendency away from transmitter signal excess which suggests the desirability of serial message components that do not share total source level. In another consideration, if transmitting all message components in a single message cycle is disadvantageous due to limitations imposed by altitude, source level, or other, message components may be transmitted in serial or serial-parallel over multiple message cycles.

Figure 5B:
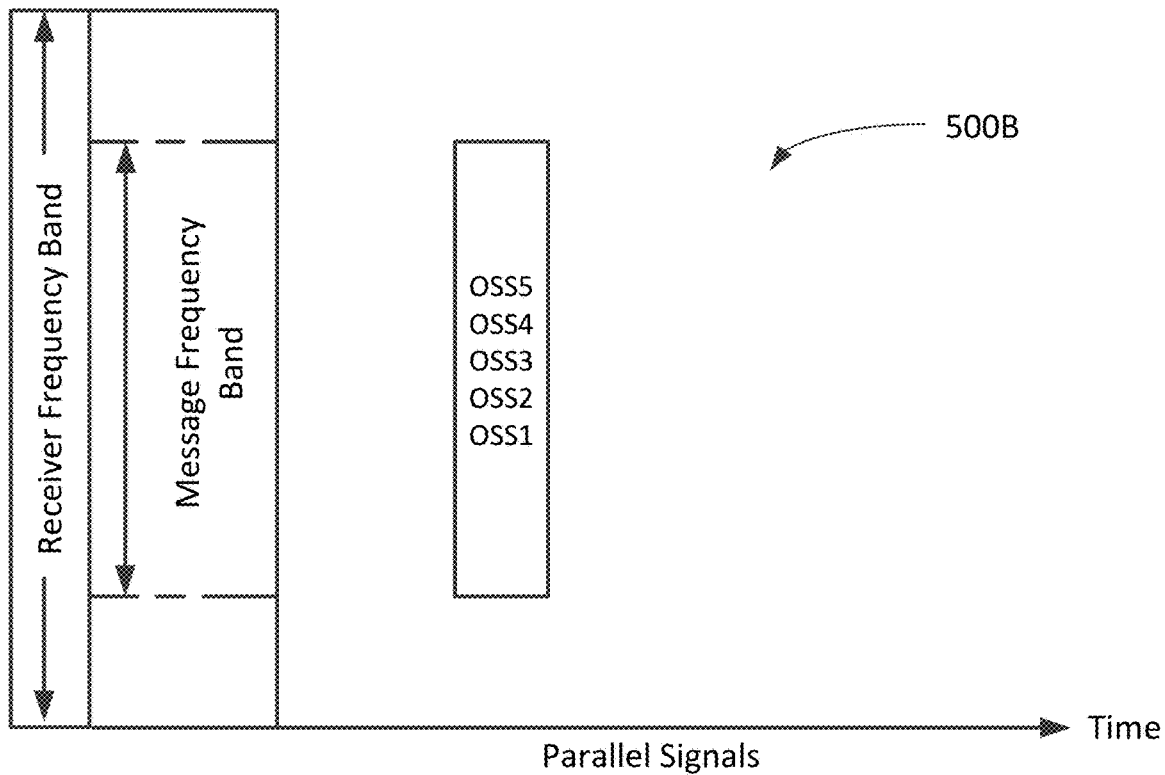

FIG. 5B shows a first multifan survey message transmission. Here, a message for ensonifying an exemplary group of five fans utilizes a spread spectrum technique such as frequency hopping with Costas codes guiding frequency selection. In particular, five orthogonal spread spectrum message components are transmitted in parallel such that each of the message components OSS1, OSS2, OSS3, OSS4, OSS5 occupies the entirety of a message frequency band that is a subset of a receiver's frequency operating range. Subset here refers to less than all of, for example one half, one third, or one fourth of a receiver's frequency operating range.

Figure 5C:
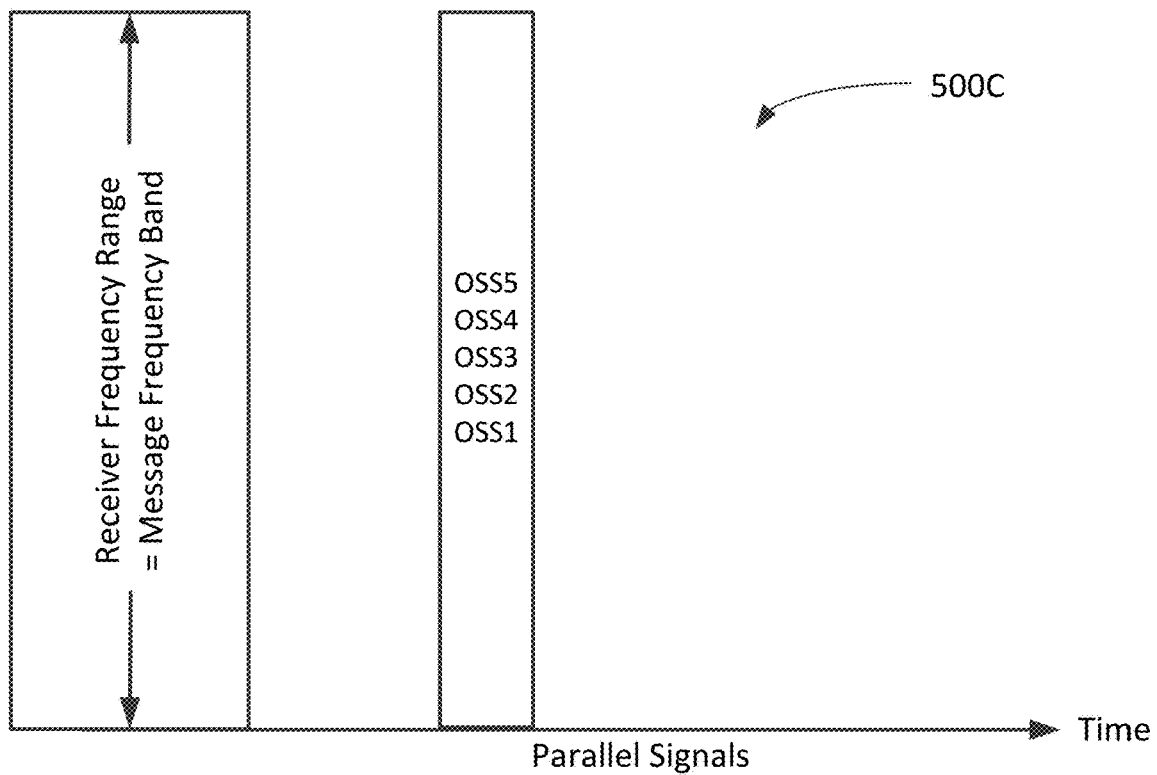

FIG. 5C shows a second multifan survey message transmission. Here, a message for ensonifying an exemplary group of five fans utilizes a spread spectrum technique such as frequency hopping with Costas codes guiding frequency selection. In particular, five orthogonal spread spectrum message components are transmitted in parallel such that each of the message components OSS1, OSS2, OSS3, OSS4, OSS5 occupies a frequency band that is substantially all of or all of a receiver's frequency operating range. This technique enables use of the receiver's entire frequency operating range for each message component as compared to techniques that utilize frequency separation to distinguish signals and thus, for a given receiver, cannot make full use of the receiver's entire frequency operating range in sending each message component.

Figure 5D:
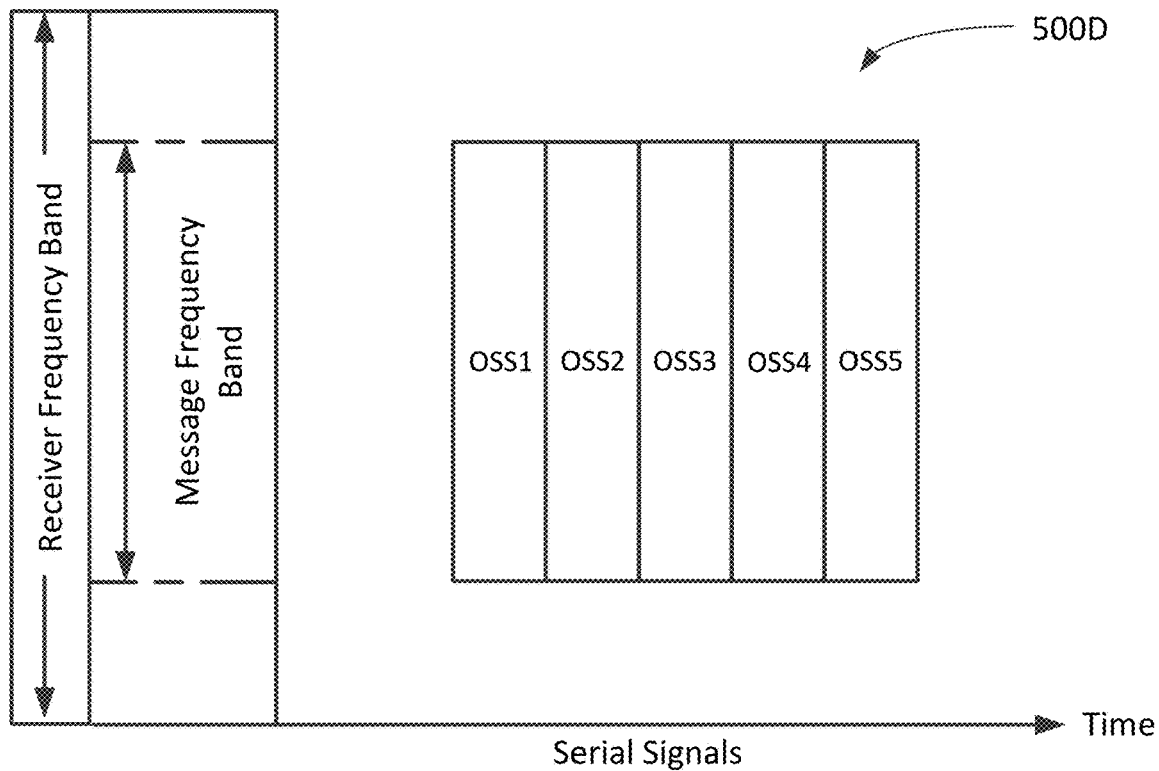

FIG. 5D shows a third multifan survey message transmission. Here, a message for ensonifying an exemplary group of five fans utilizes a spread spectrum technique such as frequency hopping with Costas codes guiding frequency selection. In particular, five orthogonal spread spectrum message components are transmitted serially. As in FIG. 5B, each of the message components OSS1, OSS2, OSS3, OSS4, OSS5 occupies the entirety of a message frequency band that is a subset of a receiver's frequency range. Further, where a message incorporates multiple serial components, transmitter source level may be dedicated to each component such that higher energy signals result as compared with overlapping parallel signals that share source level.

Figure 5E:
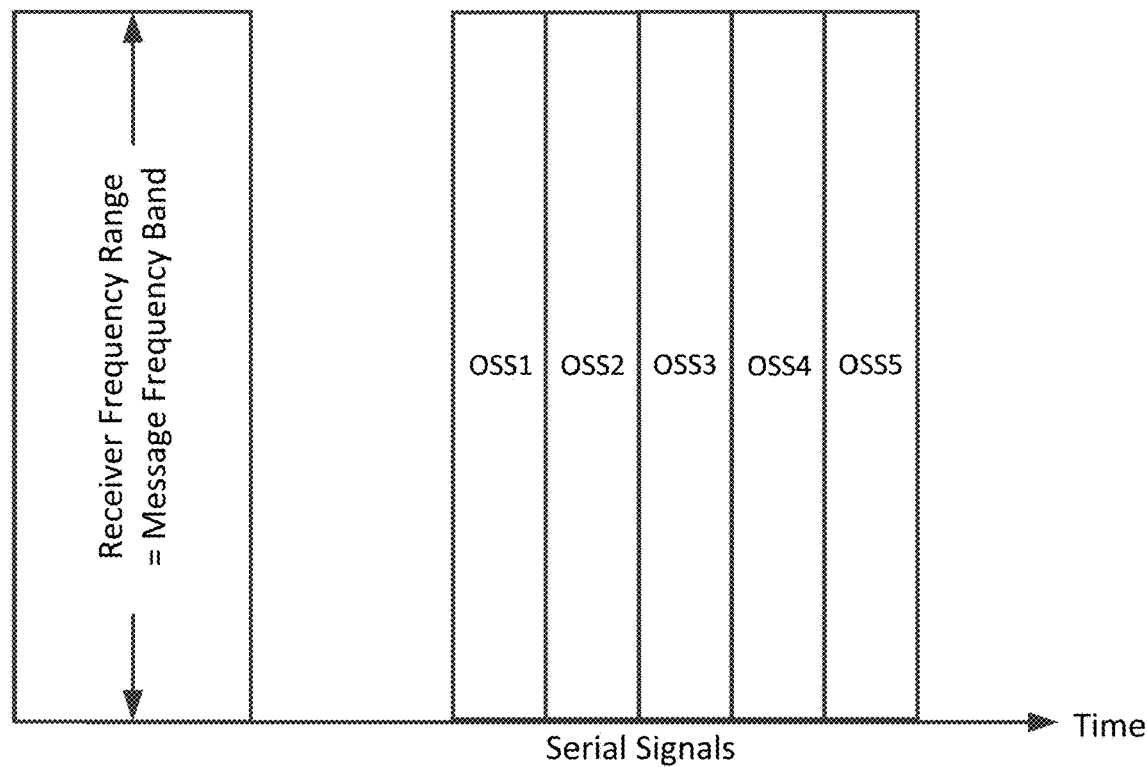

FIG. 5E shows a fourth multifan survey message transmission. Here, a message for ensonifying an exemplary group of five fans utilizes a spread spectrum technique such as frequency hopping with Costas codes guiding frequency selection. In particular, five orthogonal spread spectrum message components are transmitted serially. As in FIG. 5C, each of the message components OSS1, OSS2, OSS3, OSS4, OSS5 occupies a frequency band that is substantially all of or all of a receiver's frequency operating range.

Figure 5F:
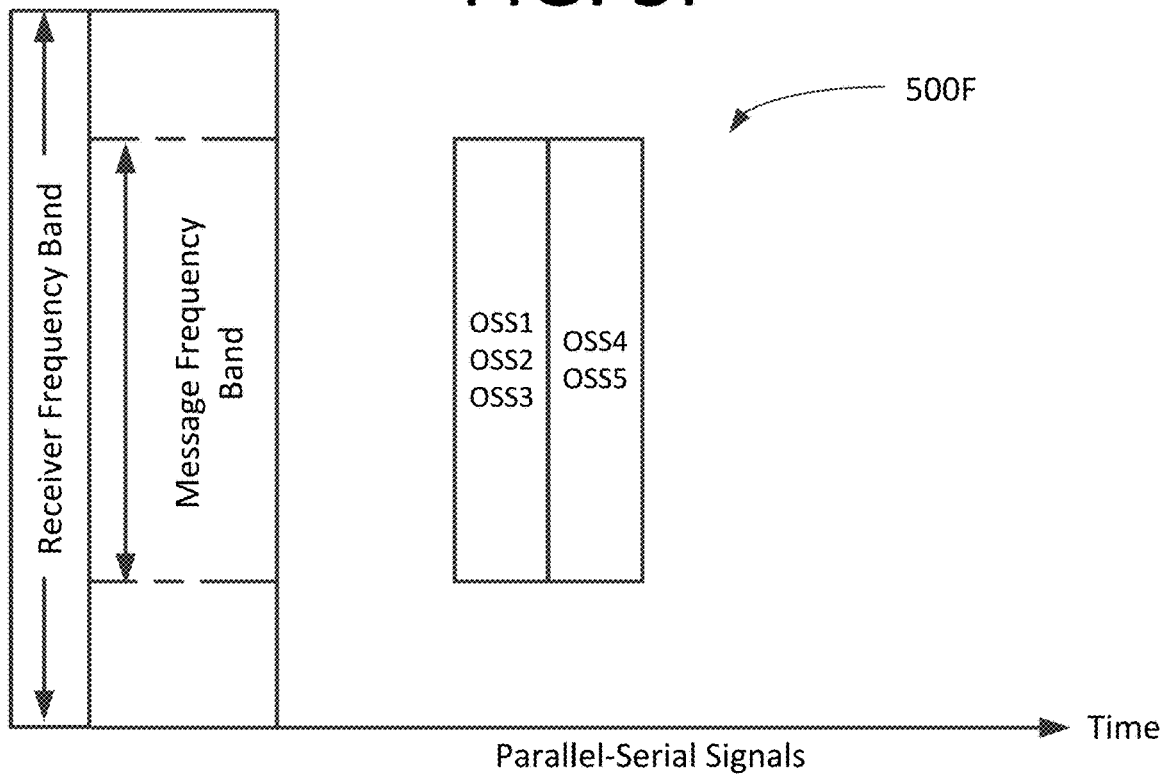

FIG. 5F shows a fifth multifan survey message transmission. Here, a message for ensonifying an exemplary group of five fans utilizes a spread spectrum technique such as frequency hopping with Costas codes guiding frequency selection. In particular, the first three of five orthogonal spread spectrum message components are transmitted in parallel and serially thereafter the last two message components are transmitted in parallel. Each of the message components OSS1, OSS2, OSS3, OSS4, OSS5 occupies the entirety of a message frequency band that is a subset of a receiver's frequency range.

Figure 5G:
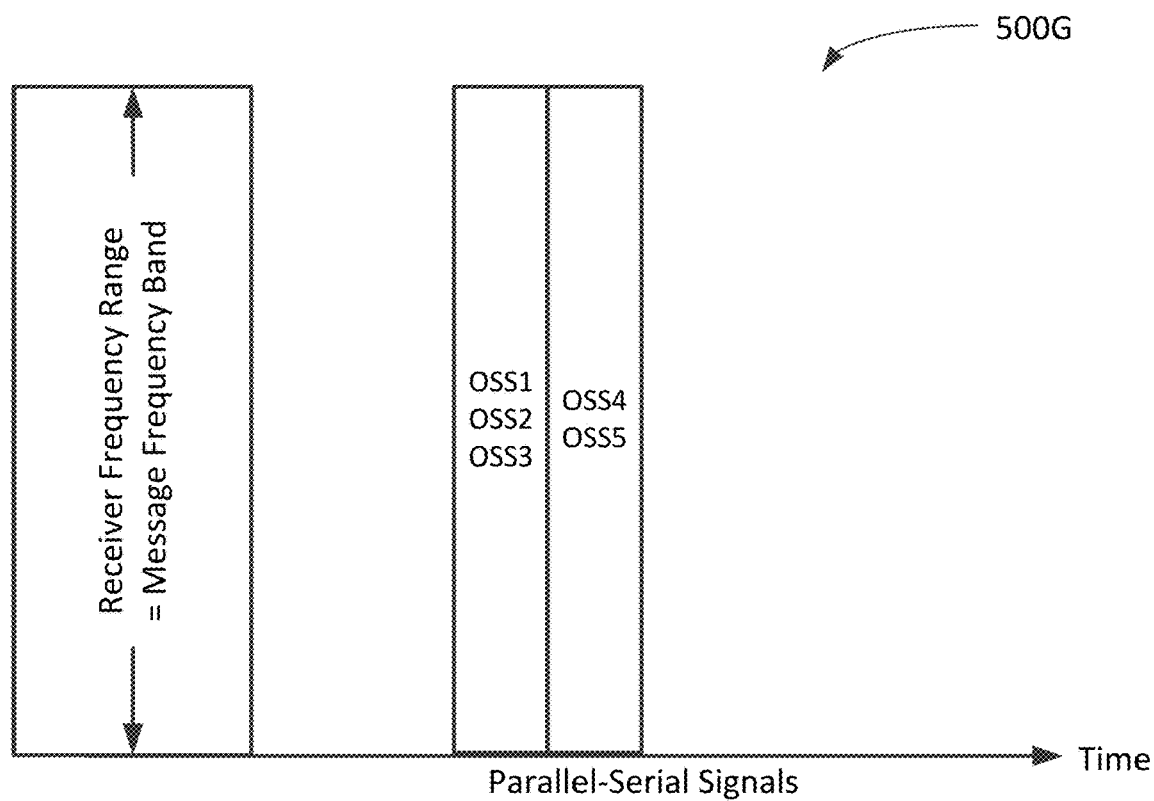

FIG. 5G shows a sixth multifan survey message transmission. Here, a message for ensonifying an exemplary group of five fans utilizes a spread spectrum technique such as frequency hopping with Costas codes guiding frequency selection. In particular, the first three of five orthogonal spread spectrum message components are transmitted in parallel and serially thereafter the last two message components are transmitted in parallel. Each of the message components OSS1, OSS2, OSS3, OSS4, OSS5 occupies a frequency band that is substantially all of or all of a receiver's frequency operating range.

Applicant notes that just as a frequency hopping spread sequence with Costas coded frequency selection technique may be used to construct the messages of FIGS. 5A-G, so too can the other codes and sequences of FIG. 4 be used to construct message components for inclusion in a single transmitted message that results in returns wherein the message components are separable or uniquely separable by a receiver by virtue of their varying codes.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A method of performing a multifan survey comprising the steps of:
    providing a multibeam echo sounder including a receiver and a transmitter for use with projector and hydrophone arrays;
    configuring the transmitter, the receiver, the projector array, and the hydrophone array to form intersecting transmit and receive beams;
    generating via the transmitter a message that includes N>=3 coded message components that overlap in time and frequency;
    exciting the projector array with the message components that overlap in time to ensonify N fans;
    receiving in the receiver via the hydrophone array returns from the ensonified fans; and,
    selectively detecting respective fan returns from the N fans using N matched filters.

2. The method of claim 1 wherein each of the message components occupies substantially all of a message frequency band.

3. The method of claim 1 wherein for N signal generators in the transmitter, each signal generator generates a respective one of the coded message components.

4. The method of claim 1 further comprising the steps of:
    generating respective ones of the coded message components using N spread spectrum signal generators in the transmitter; and,
    wherein a message component frequency band occupies less than one-half of the receiver operating frequency range.

5. The method of claim 1 wherein additional message components in the message do not overlap in frequency with the N message components.

6. The method of claim 1 further comprising the steps of:
    generating respective ones of the coded message components using N spread spectrum signal generators in the transmitter; and,
    wherein a message component frequency band occupies substantially all of the receiver operating frequency range.

7. The method of claim 1 wherein a set of differing frequency hopping codes is used to guide a selection of three or more frequencies characterizing each message component.

8. The method of claim 7 wherein the message component includes sequential sinusoidal waveforms at the three or more frequencies.

9. The method of claim 7 wherein Costas codes are used to guide the selection of frequencies.

10. The method of claim 1 wherein the message components are of equal length.

11. The method of claim 1 wherein some message components utilize frequency hopping codes.

12. The method of claim 1 wherein the message includes five or more message components.

13. The method of claim 1 further comprising the steps of:
generating multiple beams in N respective transmit beamformers for each of the N message components; and,
summing the beams in a summation block.

14. The method of claim 1 further comprising the steps of:
receiving in respective hardware pipelines T hydrophone signals from an array of T hydrophones; and,
providing T hardware pipeline outputs from the T hardware pipelines.

15. The method of claim 14 further comprising the steps of:
providing N inputs to each of T software pipelines such that (N×T) software pipeline inputs are provided using signals derived from each of the T hardware pipeline outputs; and,
wherein (N×T) software pipeline outputs correspond to the (N×T) software pipeline inputs.

16. The method of claim 15 further comprising the steps of:
receiving the (N×T) software pipeline outputs in each of N receive beamformers such that no beamformer receives more than one signal derived from the same hydrophone; and,
receiving in respective processors the outputs of the N beamformers to provide a survey result or an intermediate survey result.

17. The method of claim 16 wherein at least one of the hardware pipelines includes sequential signal processing through a first amplifier, a low-pass anti-aliasing filter, a second amplifier, and an analog to digital converter.

18. The method of claim 17 wherein at least one of the software pipelines includes sequential signal processing through a mixer, a bandpass filter, a decimator, and a matched filter.

19. The method of claim 18 wherein there are 64 or more hydrophones.

20. The method of claim 18 wherein there are 128 or more hydrophones.

21. A method of performing a multifan bathymetric survey comprising the steps of:
providing a multibeam echo sounder including a receiver and a transmitter for use with a plurality of transducers in a single projector array and a plurality of transducers in a single hydrophone array;
configuring the transmitter, the receiver, the projector array, and the hydrophone array to form intersecting transmit and receive beams;
generating via the transmitter a message that includes N>=3 coded message components that do not overlap in time;
exciting the projector array with the message components to ensonify N fans;
receiving in the receiver via the hydrophone array returns from the ensonified fans; and,
selectively detecting respective fan returns from the N fans using N matched filters.

22. The method of claim 21 wherein each of the message components occupies substantially all of a message frequency band.

23. The method of claim 21 wherein for N signal generators in the transmitter, each signal generator generates a respective one of the coded message components.

24. The method of claim 21 further comprising the steps of:
generating respective ones of the coded message components using N spread spectrum signal generators in the transmitter; and,
wherein a message component frequency band occupies less than one-half of the receiver operating frequency range.

25. The method of claim 21 wherein additional message components do not overlap in frequency with the N message components.

26. The method of claim 21 further comprising the steps of:
generating respective ones of the coded message components using N spread spectrum signal generators in the transmitter; and,
wherein a message component frequency band occupies substantially all of the receiver operating frequency range.

27. The method of claim 21 wherein a set of differing frequency hopping codes is used to guide a selection of three or more frequencies characterizing each message component.

28. The method of claim 27 wherein the message component includes sequential sinusoidal waveforms at the three or more frequencies.

29. The method of claim 27 wherein Costas codes are used to guide the selection of frequencies.

30. The method of claim 21 wherein adjacent components of the message are separated in frequency.

31. The method of claim 21 wherein some message components utilize frequency hopping codes.

32. The method of claim 21 wherein the message includes five or more message components.

33. The method of claim 21 further comprising the steps of:
generating multiple beams in N respective transmit beamformers for each of the N message components; and,
summing the beams in a summation block.

34. The method of claim 21 further comprising the steps of:
receiving in respective hardware pipelines T hydrophone signals from an array of T hydrophones; and,
providing T hardware pipeline outputs from the T hardware pipelines.

35. The method of claim 34 further comprising the steps of:
providing N inputs to each of T software pipelines such that (N×T) software pipeline inputs are provided using signals derived from each of the T hardware pipeline outputs; and,
wherein (N×T) software pipeline outputs correspond to the (N×T) software pipeline inputs.

36. The method of claim 35 further comprising the steps of:
receiving the (N×T) software pipeline outputs in each of N receive beamformers such that no beamformer receives more than one signal derived from the same hydrophone; and,
receiving in respective processors the outputs of the N-beamformers to provide a survey result or an intermediate survey result.

37. The method of claim 36 wherein at least one of the hardware pipelines includes sequential signal processing through a first amplifier, a low-pass anti-aliasing filter, a second amplifier, and an analog to digital converter.

38. The method of claim 37 wherein at least one of the software pipelines includes sequential signal processing through a mixer, a bandpass filter, a decimator, and a matched filter.

39. The method of claim 38 wherein there are 64 or more hydrophones.

40. The method of claim 38 wherein there are 128 or more hydrophones.

41. A method of performing a multifan bathymetric survey comprising the steps of:
- providing a multibeam echo sounder including a receiver and a transmitter for use with a plurality of transducers in a single linear projector array and a plurality of transducers in a single linear hydrophone array;
- configuring the transmitter, the receiver, the projector array, and the hydrophone array to form intersecting transmit and receive beams;
- generating via the transmitter a message that includes $N>=3$ coded message components that overlap in time and frequency;
- exciting the projector array with the message components that overlap in time to ensonify N fans;
- receiving in the receiver via the hydrophone array returns from the ensonified fans; and,
- selectively detecting respective fan returns from the N fans using N matched filters.

42. The method of claim 41 wherein the arrays are arranged to form a Mills cross.

* * * * *